United States Patent
Rickert

(10) Patent No.: US 11,763,402 B1
(45) Date of Patent: Sep. 19, 2023

(54) SYSTEM AND METHOD FOR GIFTING FOOD AND BEVERAGES

(71) Applicant: PintPass, LLC, Bozeman, MT (US)

(72) Inventor: Ryan Rickert, Bozeman, MT (US)

(73) Assignee: PintPass Software, Inc., Bozeman, MT (US)

( * ) Notice: Subject to any disclaimer, the term of this patent is extended or adjusted under 35 U.S.C. 154(b) by 0 days.

(21) Appl. No.: 17/130,627

(22) Filed: Dec. 22, 2020

Related U.S. Application Data

(63) Continuation-in-part of application No. 15/409,253, filed on Jan. 18, 2017, now abandoned.

(60) Provisional application No. 62/280,094, filed on Jan. 18, 2016.

(51) Int. Cl.
| | |
|---|---|
| *G06Q 50/12* | (2012.01) |
| *G06Q 30/0601* | (2023.01) |
| *G06Q 20/32* | (2012.01) |
| *G06Q 30/0207* | (2023.01) |
| *G06F 3/04847* | (2022.01) |

(52) U.S. Cl.
CPC ......... *G06Q 50/12* (2013.01); *G06Q 20/3255* (2013.01); *G06Q 30/0212* (2013.01); *G06Q 30/0607* (2013.01); *G06Q 30/0641* (2013.01); *G06F 3/04847* (2013.01)

(58) Field of Classification Search
None
See application file for complete search history.

(56) References Cited

U.S. PATENT DOCUMENTS

| | | | | |
|---|---|---|---|---|
| 9,665,887 | B2 * | 5/2017 | Raina | H04L 51/224 |
| 2011/0153403 | A1 * | 6/2011 | Postrel | G06Q 30/02 |
| | | | | 705/14.29 |
| 2013/0096715 | A1 * | 4/2013 | Chung | G06Q 30/02 |
| | | | | 700/233 |
| 2013/0275250 | A1 * | 10/2013 | Rodell | G06Q 30/0208 |
| | | | | 705/26.1 |
| 2014/0108177 | A1 * | 4/2014 | Erke | G06Q 30/0601 |
| | | | | 705/26.1 |
| 2014/0316937 | A1 * | 10/2014 | Jiao | G06Q 30/0643 |
| | | | | 705/26.8 |
| 2015/0088561 | A1 * | 3/2015 | Charles | G06Q 10/02 |
| | | | | 705/5 |
| 2018/0240304 | A1 * | 8/2018 | Blatstein | G06Q 30/0238 |
| 2019/0050921 | A1 * | 2/2019 | Ryner | G06Q 20/3224 |
| 2020/0051148 | A1 * | 2/2020 | Green | G06K 9/00885 |
| 2021/0264395 | A1 * | 8/2021 | Trelin | G06Q 20/18 |

* cited by examiner

*Primary Examiner* — Scott A Zare

(74) *Attorney, Agent, or Firm* — Staniford Tomita LLP

(57) ABSTRACT

Food and beverage gifts can be transmitted from a first mobile computing device to a second mobile computing device that run an application program. The mobile computing devices communicate with a server and data for the system users is stored on a database. When food or beverages are gifted, a unique token generated by the server and a gift message is transmitted to the second mobile computing device. The user can go to a food or beverage provider and redeem the gift credit by showing the user interface to a staff member of the food or beverage provider. The server can record the unique token for the food or beverage gift as being used and records the value of the food or beverage gift with the food or beverage provider. The server forwards payment for the value of the food or beverage gift to the food or beverage provider.

19 Claims, 32 Drawing Sheets

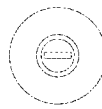
FIG. 7

FIG. 22

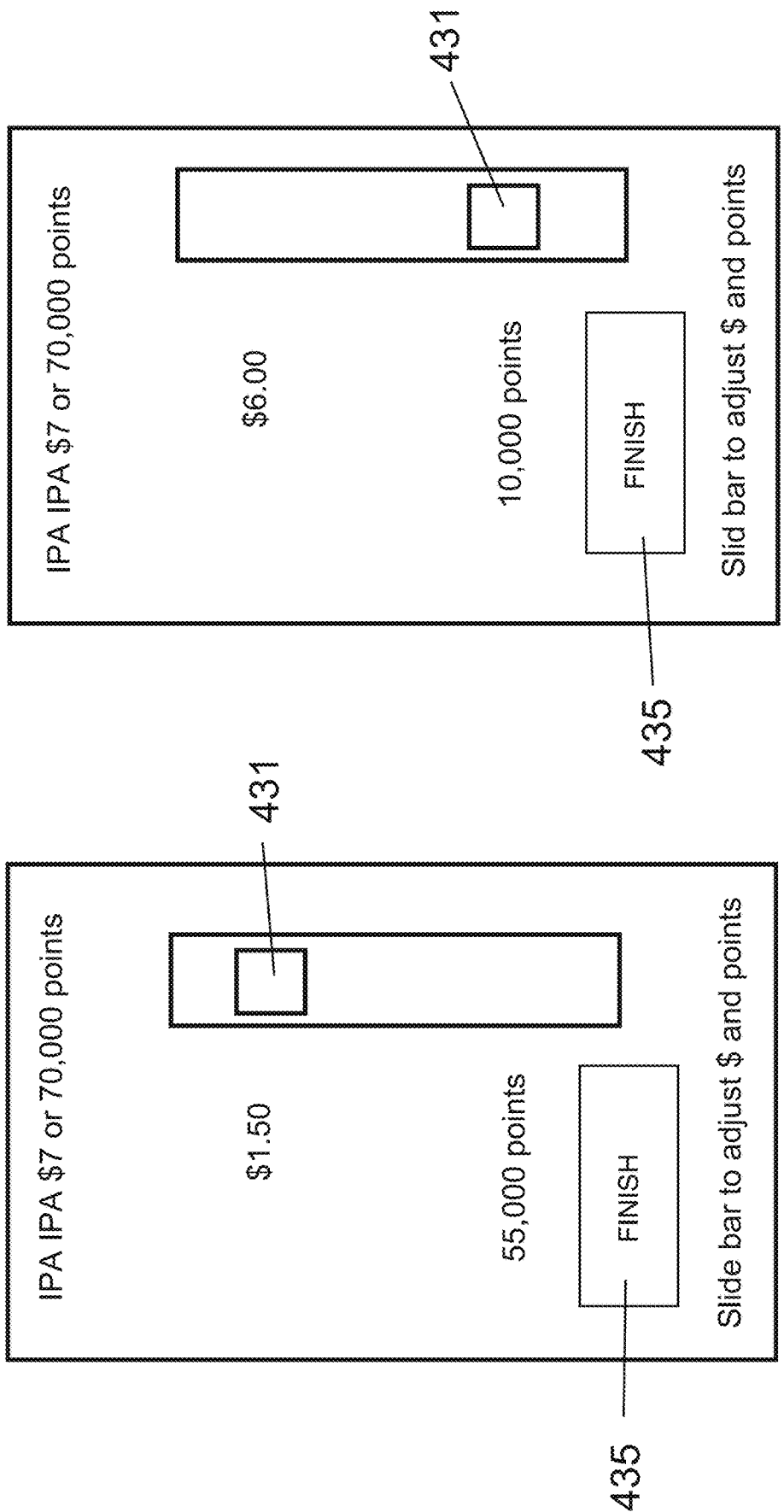

SYSTEM AND METHOD FOR GIFTING FOOD AND BEVERAGES

CROSS REFERENCE TO RELATED APPLICATIONS

This application is a continuation in part (CIP) of U.S. patent application Ser. No. 15/409,253, "System And Method For Gifting Food And Beverages" filed Jan. 18, 2017 which claims priority to U.S. Provisional Patent Application No. 62/280,094, "Method And System For Texting A Food And/Or Beverage Gift" filed Jan. 18, 2016, which is hereby incorporated by reference in its entirety. U.S. patent application Ser. No. 15/409,253 and 62/280,094 are hereby incorporated by reference in their entirety.

BACKGROUND

It is common for people to gift food and/or beverages to each other. This act of giving can be accomplished by buying someone a drink or paying for food at a restaurant. However, when the parties are separated, the gifting process can be more difficult. Food gift cards exist, which can be purchased and given from a buyer to a recipient. However, this requires purchasing the gift card and delivering the physical card to the recipient. What is needed is a more convenient system and method for gifting food and beverages.

BRIEF DESCRIPTION OF THE DRAWINGS

FIG. 7 illustrates an embodiment of a mobile computing device for a recipient user who has received a gift.

FIG. 22 illustrates an embodiment of a spinner wheel page.

FIGS. 28-35 illustrate screen shots of UIs on a mobile computing device display.

DETAILED DESCRIPTION

The present invention may take numerous forms of device and system configurations that will accommodate a diversity of social connecting functions. What follows is a preferred embodiment of the useful novelties of the invention. However, for one skilled in the art, it will be obvious that the novel features disclosed may be employed with alternate combinations and arrangements of the invention elements.

The disclosure relates to the field of software-based methods and systems to electronically buy drinks such as beers or other beverages or food for contacts or friends of system users. In an embodiment, the users can download a software application program or application "app" from an app provider server such as Apple App Store or Google Play Store. Users can select the app and download it from the app provider's server to the user's computer device where it is stored in memory. Once downloaded, the user can run the app which can display a graphical user interface.

Figure 1:
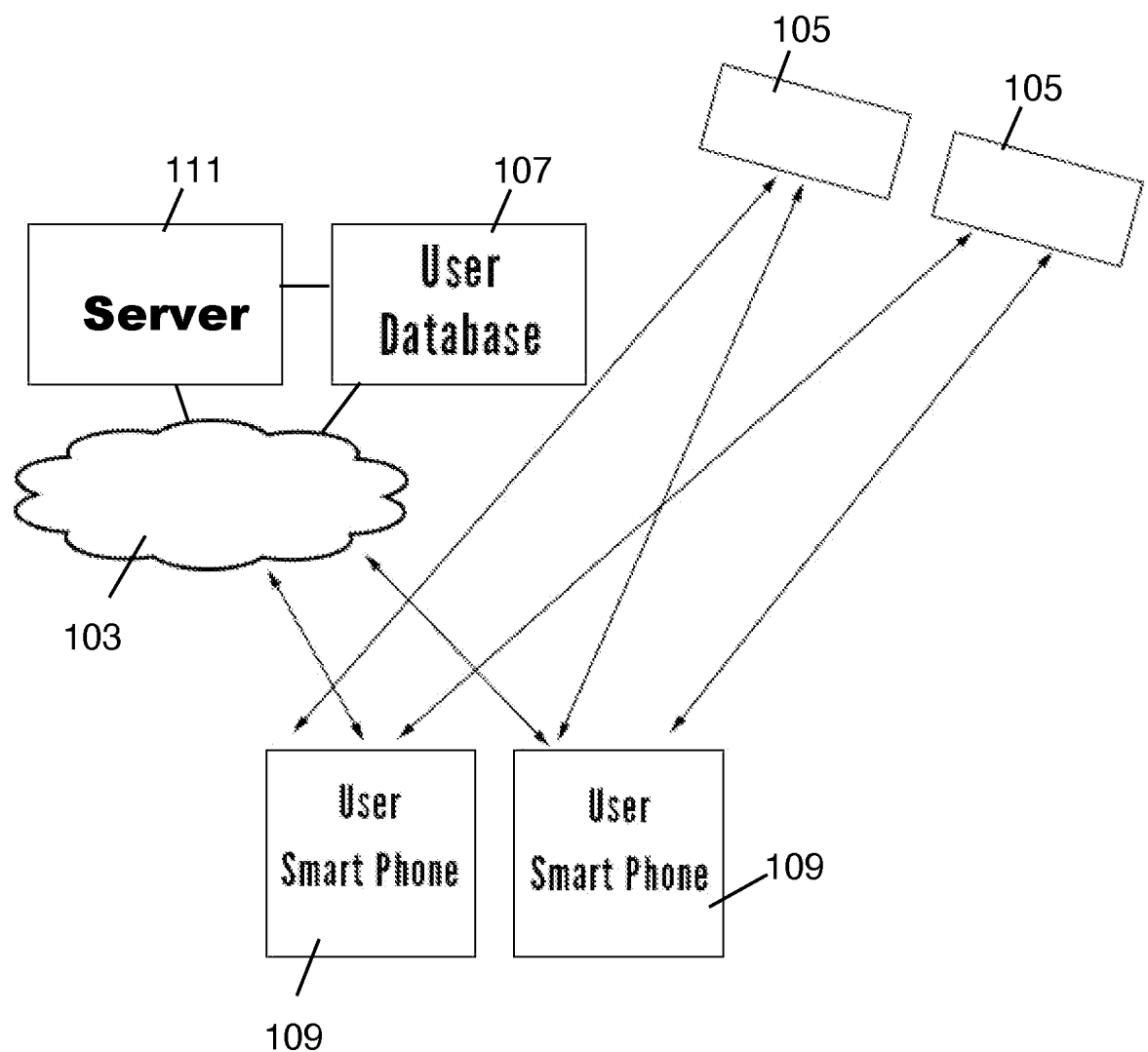
FIG. 1 illustrates an embodiment of a block diagram of the gifting system components.

With reference to FIG. 1, the system may include a server 111 coupled to a user database 107 either through a network 103 such as the internet or a direct connection. The user database 107 can store user information, user transaction history and other user personal information. The server can communicate with user computers, which can be smart phones 109 or other mobile computing devices that can be equipped with GPS or other location sensors through the network 103 which can include: the Internet, cellular networks, local area networks or any other networks. The user's cell phones 109 can receive signals from GPS satellites 105 and record or detect the user's locations. This user location information can be uploaded and stored on the user database 107.

In an embodiment, in order to use the system, a user can download a software application program or the app from the server 111 to the user's smart phone 109. Once downloaded, the user can run the app on the processor in the smart phone 109 mobile computing device. The system users can create profiles which are stored on the user database 107 coupled to the system server 111. A user profile can be created by either answering questions, inputting user data or downloading personal information from other sources such as Facebook, Google, etc. through a user interface on a smart phone 109 mobile device and/or through another computer in communication with the system server and user database 107. Additional information about the users can be automatically input or manually input in various ways. For example, the user can type the input information or selected location information on a graphical user interface (GUI) map. In other embodiments, a GPS in the smart phone 109 mobile computing device can determine a location of the user. The location information can identify breweries or other food establishments that may be in the areas around the users. In different embodiments, the system illustrated in FIG. 1 can be used for various processes and systems including beverage and food gifting systems such as: "Text-A-Beer" and "PintPass" which are described in more detail below. Although the following description is for gifting or purchasing of beer from bars and breweries, in other embodiments, this system can be used for any other food or beverage gifting.

In different embodiments, the system can be a beverage gifting program such as PintPass that offers members and system users the ability to text a beverage gift (such as a beer) to any of their personal and professional contacts, either by text or email. In an embodiment, a user runs the app and clicks on a user interface button in the app that brings up a form where the user selects or otherwise inputs the intended beverage recipient, the number of beers, and optionally a personalized message. The beverage sender's payment card such as credit card or debit card is transacted and a beer is electronically credited to the person. The recipient isn't required to become a member to receive the beer, but he or she may be required to download the free mobile app. The recipient may need to enter their name and email to redeem the food or beverage credit. The recipient can go to any participating food or beverage vendor to redeem the credit. For example, a recipient may go to a program member brewery and redeem their beer credit for a beer.

In some embodiments, a proof of age can be required to redeem an alcoholic beverage credit such as a beer credit. The recipient of the beverage can provide proof of age documents such as a license or a passport with a photo and birthday information. In other embodiments, the system can require the mobile computing device to only allow use of the app software if the user can verify their age as being more than 21 years in the United States. Please note that other countries have different drinking age limits and these different ages can be verified in the same manner. As part of the information stored for each of the users, some biometric information can be stored such as facial photographs and fingerprints. The use can also input additional information such as home address and this information can be compared to personal databases to verify the age of the system users. If the user is not able to verify his or her age, the system will not allow the user to use the software to purchase alcoholic beverages but may allow the user to purchase gifts for other system users.

When the user receives the alcoholic beverage, the user can control the mobile computing device to verify the user's identity by facing the camera and having the device confirm that the user's face matches the photographic data. Alternatively, the user can input the finger on an integrated fingerprint reader to confirm that the user receiving the alcoholic beverage matches the stored identification. If the age is verified by the system, the mobile computing device can display a message in large text verifying the person's age is greater than 21 years (or other minimum age). If an unauthorized person is using the mobile computing device, the system will detect the biometric data does not match the stored data and the system can display a message in large text indicating that the person is unauthorized and may be of an age less than 21 years (or other minimum age).

A user can first download the app onto a computing device such as a smart phone and store the application in memory. The user can then run the app on the processor of the computing device. In an embodiment, the computing device can have a location sensor such a GPS. In an embodiment, the user is prompted by the app to allow locations services to determine location based on GPS. If the user clicks the agree button, the location information can be transmitted to a system server which can respond by transmitting the names, addresses and phone numbers of member breweries in the vicinity of the computing device. This information can then be displayed on the user interface. The member breweries can include breweries and restaurants which are in the system database which have agreed to participate in the PintPass program.

Figure 2:
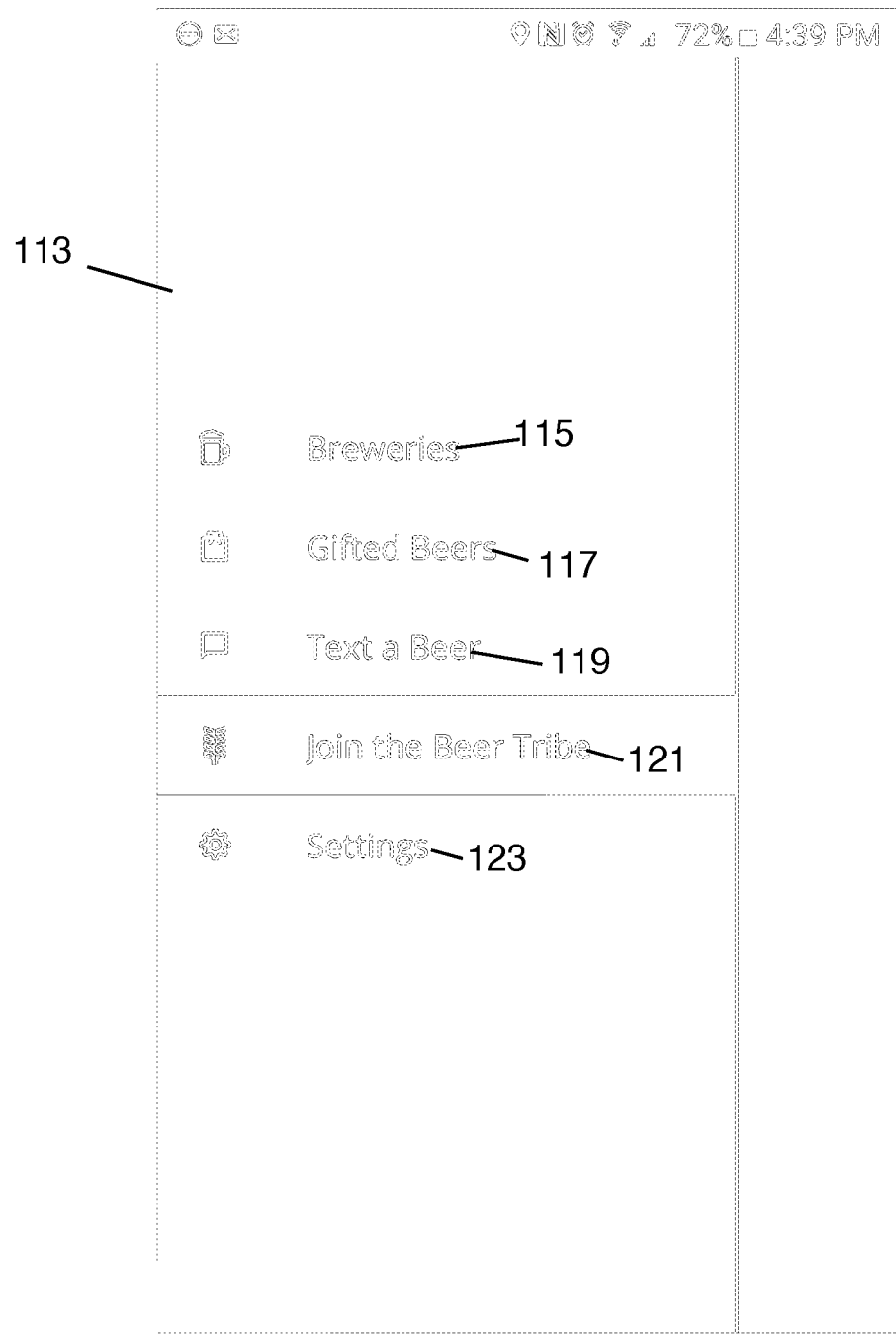
FIG. 2 illustrates an embodiment of a user interface menu on a mobile computing device.

A screenshot of a user interface of an app is illustrated. With reference to FIG. 2, an embodiment of a user interface (UI) 113 for the app on the mobile computing device is illustrated. The UI 113 of the app can also display a list of different app features in a menu. In the illustrated embodiment, the first app feature is "Breweries" 115, which can include a beer glass icon. If this feature is selected, the UI 113 will display a list of member breweries and restaurants that can be sorted by name, address, proximity. The second app feature can be "Gifted Beers" 117 with a gift box icon. If this feature is selected, the UI 113 can list the user's claimed and unclaimed beer credits. The third feature is "Text-A-Beer" 119 with a text message icon. If this feature is selected, the app opens a screen that allows user to text or email a beer credit to one of their contacts. The fourth feature is "Join the Beer Tribe" 121 with the arrow icon. If this feature is selected, the UI 113 takes the user to the Beer Tribe membership sign up page. The fifth illustrated feature is "Settings" 123 with a gear icon. Selecting this feature allows users to control the functional setting for the app and their account.

Figure 3:
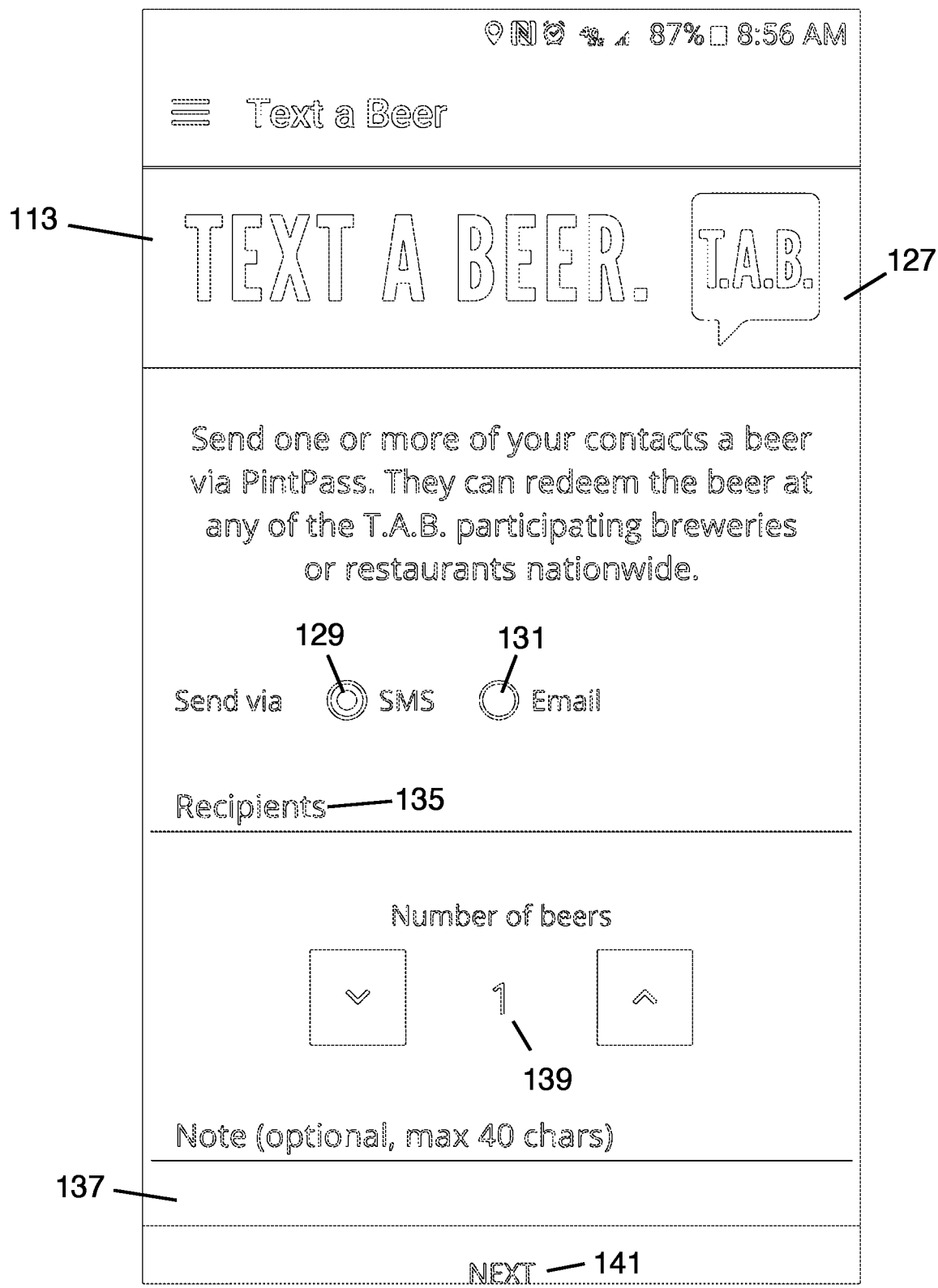
FIG. 3 illustrates an embodiment of a gifting data input on a mobile computing device.

With reference to FIG. 3, if the user clicks on Text-A-Beer, the UI 113 can display the Text-A-Beer screen 127. The Text-A-Beer screen 127 can include inputs through which a user can decide how to transmit the beer gift. In this embodiment, the user can text via SMS or email the beer by clicking on the "SMS" button 129 or "Email" button 131. The user can then input the recipient's name or phone number in the "recipients" input 135. The system can search the user's contacts list from the user database and display more recipient information so that the user can select the right person. The UI 113 can also allow the user to select the "number of beers" 139 to be sent, and optionally, the user can input a personalized message in the "note" section 133 of the UI 113. When the beer or beers are transmitted, the note can also be transmitted to the recipient. Once the required information is input to the Text-A-Beer screen 127, the user can press the next button 141.

Figure 4:
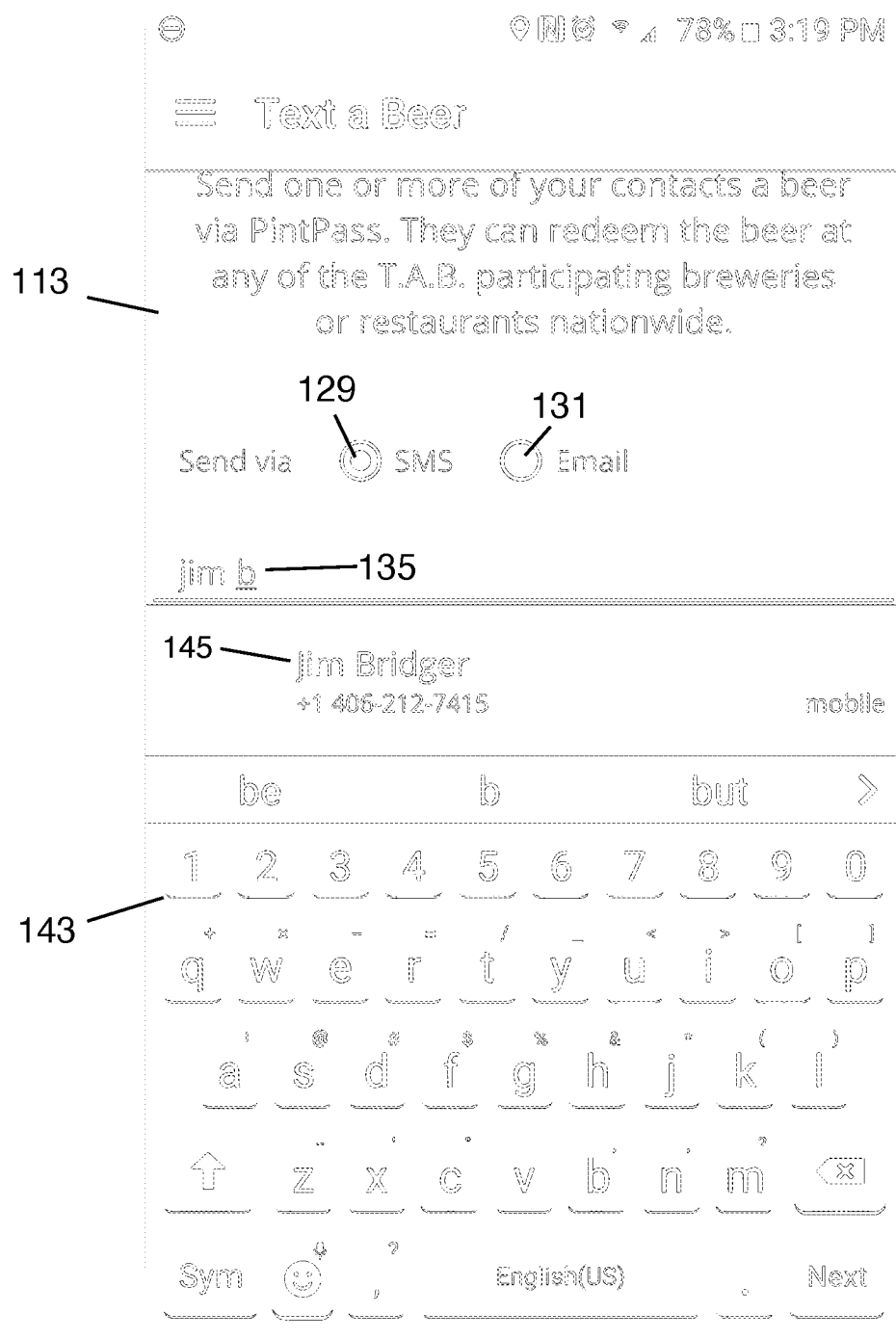
FIG. 4 illustrates an embodiment of a recipient selection input on a mobile computing device.

With reference to FIG. 4, in an illustrated example of selecting a recipient, the user has clicked on the recipient input 135, which prompts a QWERTY keyboard 143 on the user interface 113. The user has used the keyboard 143 to typed in "Jim B" 135, for example, and the system has searched the contact database on the computing device for all contacts matching this text input. In this example, the contact database search lists "Jim Bridger" 145 and the associated phone number as a possible match. Information for each of the contacts found in the database are listed on a contact portion on the UI. The user can click on the desired recipient from the displayed list to complete the phone number or email delivery means.

Figure 5:
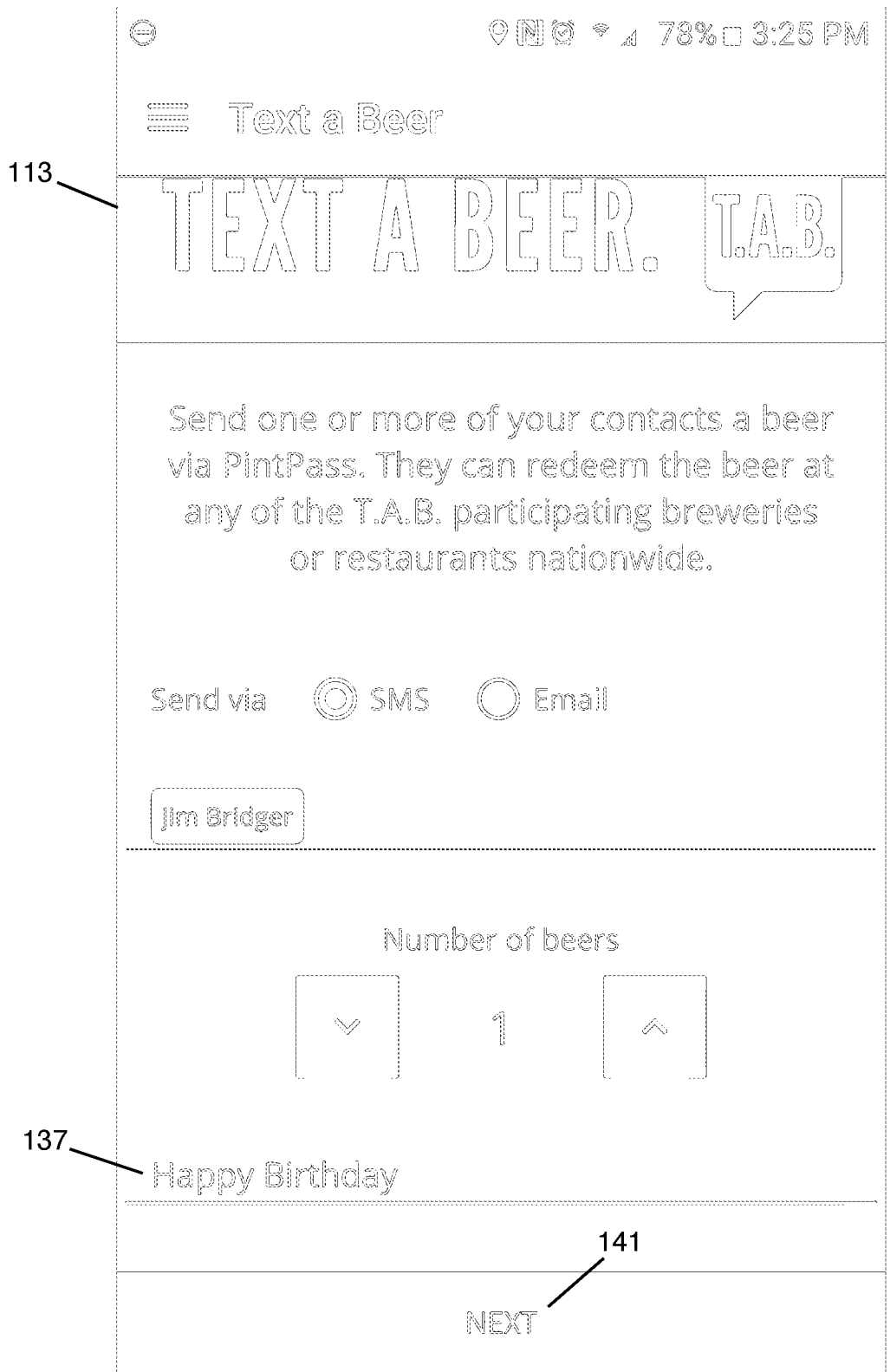
FIG. 5 illustrates an embodiment of a text message input on a mobile computing device.

With reference to FIG. 5, the user interface 113 is displayed once the recipient Jim Bridger is chosen and after the user has input the message "Happy Birthday" in the note section 137. The note can be input using the keyboard as described above with reference to FIG. 4. Once the message is input, the user can then click on the "next" button 141 and payment for the gifted beverage is input. The payment can be performed with credit card information, debit card information, system credit or any other suitable payment mechanism.

Figure 6:
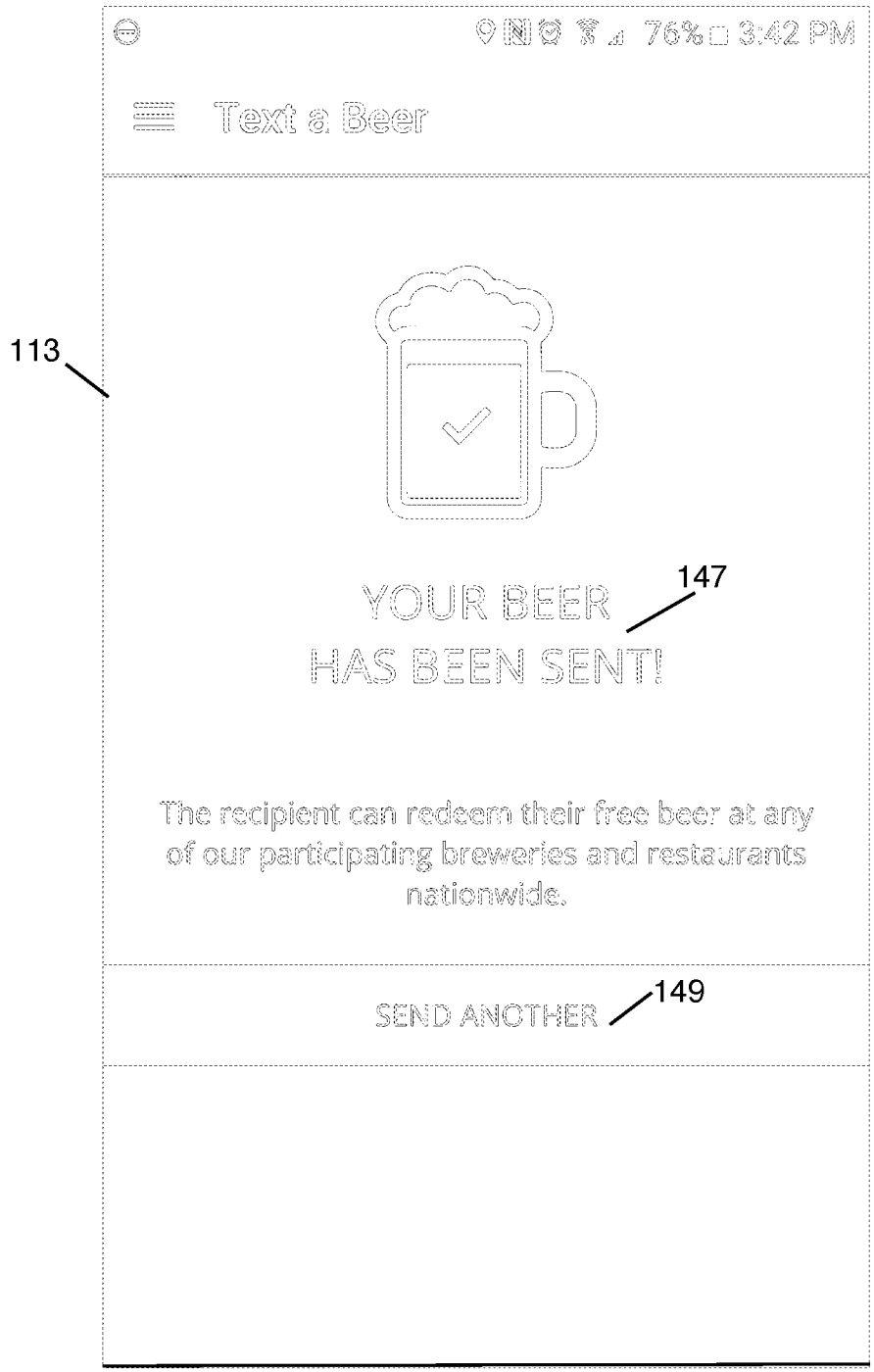
FIG. 6 illustrates an embodiment of a sent gift confirmation on a mobile computing device.

With reference to FIG. 6, once payment is confirmed, a confirmation screen is displayed. In this example, the user interface 113 displays a message informing the user that the beer was successfully sent 147. The user interface 113 can also include a "send another" button 149 that provides the option of sending another beer. If the user clicks on the "send another" button 149, the UI can repeat the described "TEXT-A-BEER" process.

The server receives the beverage gift order and transmits an email or text message to the designated recipient with a gift delivery message and the optionally personalized message from the sender. The server can also bill the sender by the selected purchase means. The server can also apply a beverage credit to the recipient's account in the system user database and also record the beer purchase in the sender's account.

The mobile computing device of the recipient receives a text or email (depending on which option was selected by the sender) from the server delivering the beverage gift. With reference to FIG. 7, the user interface 113 of the mobile computing device receives a text gift notification 151 alerting them that the sender has sent them a beer via PintPass. In this example, the sender "Jim Bridger" has texted a beer to the recipient. The message also explains to the recipient how to claim their beer. The recipient receives a message stating, "Jim Bridger has sent you a beer! Happy birthd . . . " The message has been truncated but is fully visible when the user clicks on the message. The message can include a hypertext link in a screen that allows the recipient to claim their gifted beer.

Figure 8:
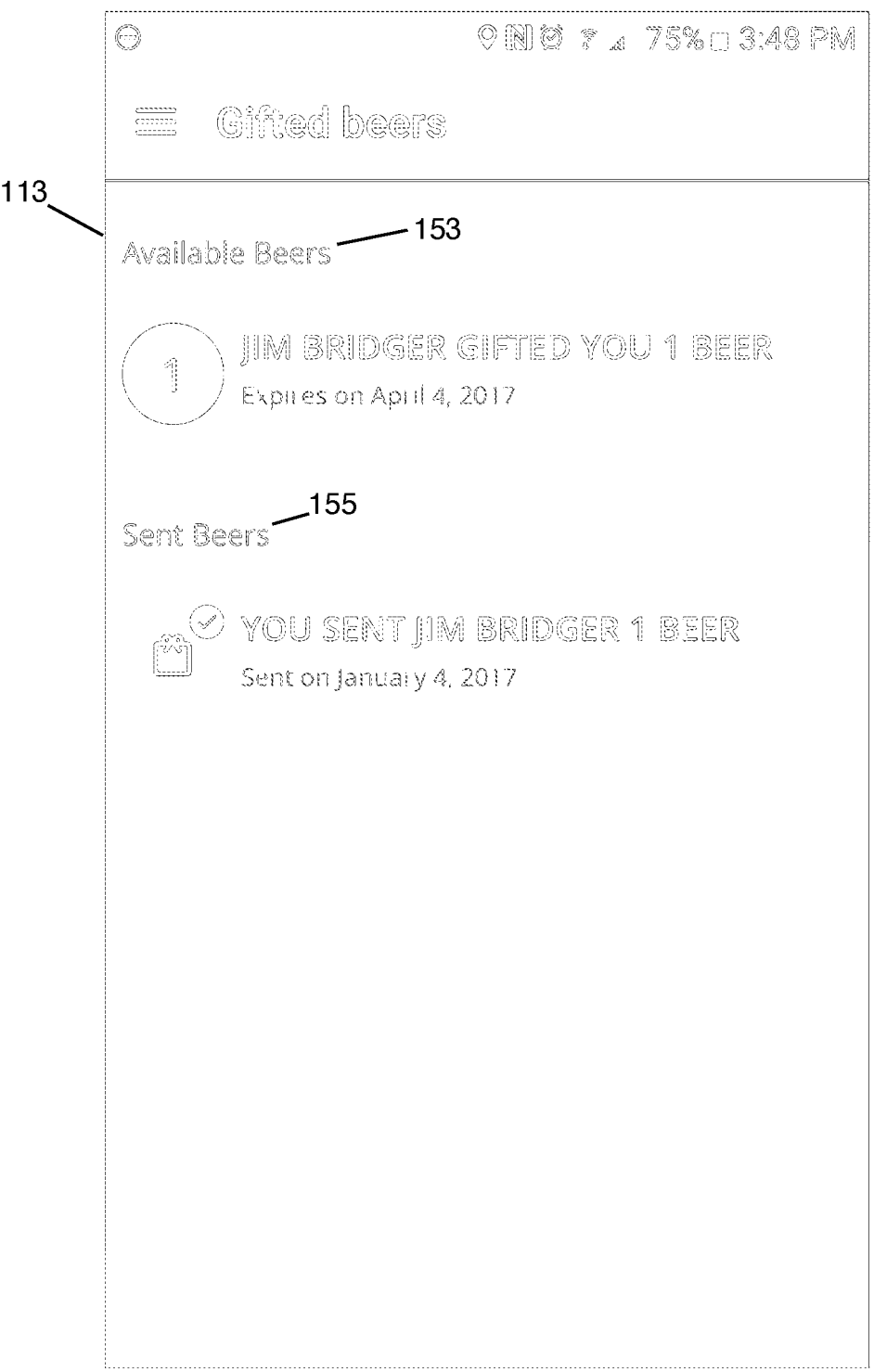
FIG. 8 illustrates an embodiment of a screen shot of a mobile computing device showing available gifts to be redeemed and sent gifts.

As discussed above with reference to FIG. 2, the system menu listing includes Gifted Beers. By clicking on the Gifted Beers button, the user can check the available gifted beers and the sent gifted beers. With reference to FIG. 8, the UI 113 of a system user's computing device can show the "gifted beer" screen which can list who gifted the beers, the expiration date of the gift and the redemption status of those beers. In this example, the "Available Beers" 153 include one beer from Jim Bridger that will expire on Apr. 4, 2017. The UI 113 can also display the user's gifted sent beers 155. In this example, the user has sent one beer gift to Jim Bridger on Jan. 4, 2017. In other embodiments, the UI 113 can display can also show when beer was gifted, who sent it, and show the claimed beers. For example the UI can display a number of "claimed beers." When a beer is claimed by the user, the server updates the status of the user's beers and changes one beer from unclaimed to claimed.

Figure 9:
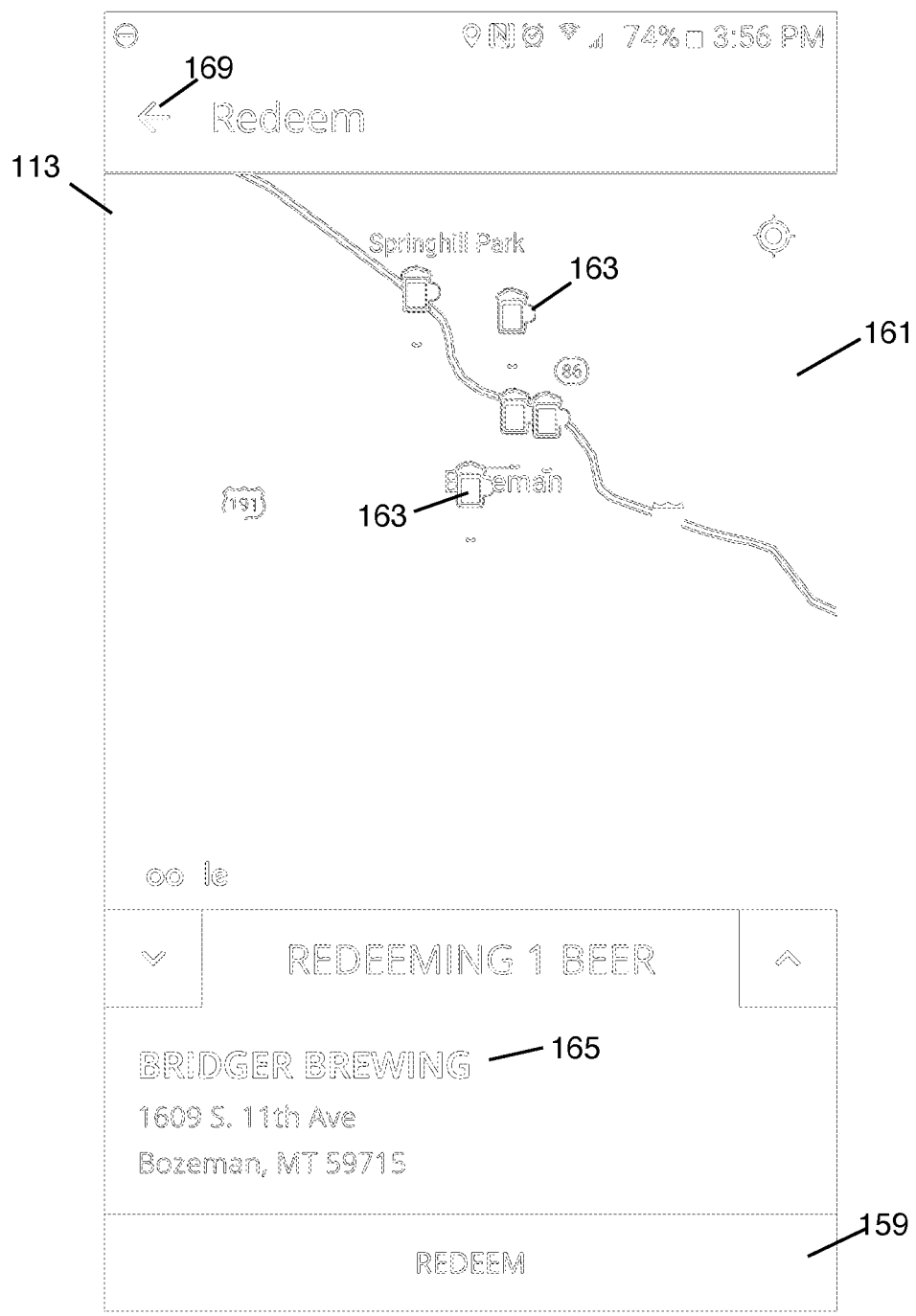
FIG. 9 illustrates an embodiment of a screen shot of a mobile computing device showing a map of participating breweries.

With reference to FIG. 9, when a user clicks on one of their unclaimed beers, the UI 113 can display a map 161 of the breweries that are program participants in the proximity of the user based upon the GPS location of the user. In this example, the breweries and restaurants are indicated by beer mug icons and fork icons 163. The user can then choose which brewery in the area they would like to redeem their beer. Additional information for the selected beer supplier brewery or restaurant 165 can be shown on UI 113. If the selected brewery or restaurant 165 is correct, the user can verify the purchase by clicking on the "redeem" button 159 to redeem the gifted beer. If a mistake has been made, the user can click on the back button 169 to return to the previous UI screen.

Figure 10:
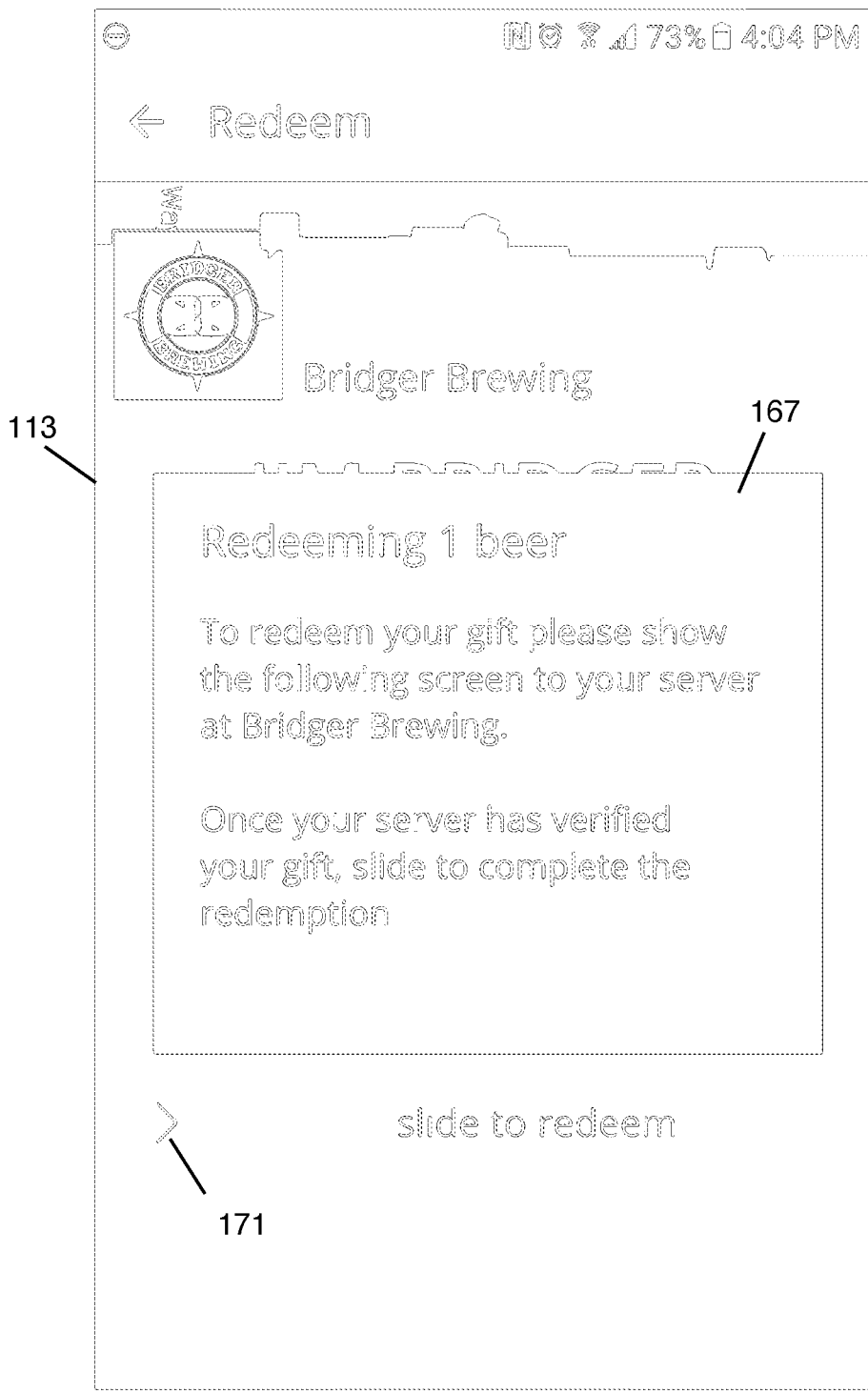
FIG. 10 illustrates an embodiment of a screen shot of a mobile computing device showing a gift redemption screen.

After the "redeem" button is clicked, a final confirmation message and instructions 167 are displayed as shown in FIG. 10. The message and instructions 167 can inform the user that 1 beer is being redeemed at the specified brewery. In this example, the brewery is "Bridger Brewing". The instructions 167 tell the user to show the UI 113 to the server and then slide the redeem slider 171 to complete the redemption.

Figure 11:
FIG. 11 illustrates an embodiment of a screen shot of a mobile computing device showing a gift redemption confirmation screen.

With reference to FIG. 11, once a user chooses a brewery and redeems their beer credit, a confirmation message 167 is displayed on the UI 113 of the user's computing device showing that the beer was successfully redeemed. In other embodiments, the UI 113 may show how many remaining beer credits the user has remaining.

In an embodiment, the UI 113 can also display the name of the user 173 redeeming the beer and the name of the selected brewery 175. This information on the UI can be shown to the waiter/waitress to claim the beer from the brewery. These validation measures will indicate to the waiter/waitress that the redemption screen UI is not a screenshot from a previous beer redemption. In this example, the user has claimed 1 beer and has 1 unclaimed beer remaining. The user can click the OK button 175 to exit this UI 113 screen. The system can also provide a time and date stamp, which is stored as a transaction record on the user database.

In other embodiments, the inventive system can provide security features to ensure that breweries are only giving user validated unclaimed beers, eligible for redemption. These systems can provide more complex validation measures. In these embodiments, the waiter/waitress can be required to recognize when the "Redemption slider" has been slid and the beer has been redeemed. A user can slide the redemption slider on the confirmation screen as they show this screen to the brewery staff. The system server transmits deep links in the TEXT-A-BEER message that has associated the phone to the beer token. This token is active until the redemption slider has been activated/redeemed. In an embodiment, the server can read the token data and transmit the token data to the server which verifies the validity of the token. If the token is valid, the server can deliver the beer and complete the transaction. Once the redemption slider has been redeemed the token is no longer valid for its intended purpose.

Using the described method and system, the server can account for the beers that have been claimed for each of the system users and store this information in the database. The server can also update the "unclaimed beers" and "claimed beers" listed in the app for each of the system users. When a beer is claimed, the system can update the user's account stored in the user database and transmit an accounting of the claimed and unclaimed beers to the UI on the user's computing device. In an embodiment, the user may also update the gift sender's account so that the sender will know that the gifted beer has been redeemed. In yet another embodiment, the system can prompt the user to send a note to the gift sender when the gifted beer has been redeemed.

Figure 12:
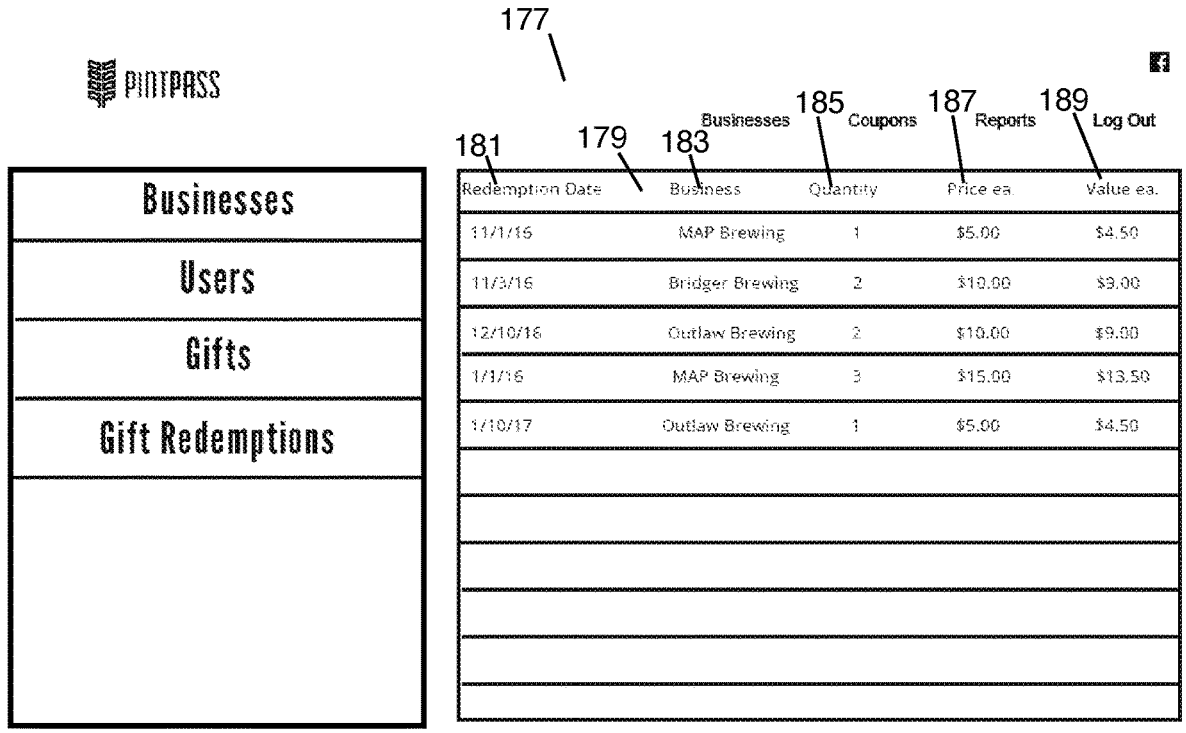
FIG. 12 illustrates an embodiment of a table listing businesses and gifts redeemed.

As discussed, the server can keep track of the user beverage gifts, gifts redeemed and gifts available. When a beverage gift is redeemed at brewery and restaurant businesses, the server can keep track of the beverages redeemed at each business and pay the businesses for the redeemed beverages. With reference to FIG. 12, a system administrator user interface 177 can display beverage gift information for a plurality of businesses. In this example, the administrator user interface 177 displays a table 179 that includes: a column for the redemption dates 181 that indicates the date of each beverage redemption, a column for businesses 183 which identifies each business where the beverages are redeemed, a column for beverage redemption quantities 185 which indicate the number of beverages redeemed at each transaction, a column for prices for each gifted beverage 187 which can be the price of each beverage being redeemed and a column for the value of each gifted beverage 189 which can be the discounted price of each beverage. In this example, a first user may give a $5 beverage to a second user. The second user may redeem the beverage at MAP Brewing. The value of the beverage can be $4.50, which is paid by the service provider to MAP Brewing. The service provider may receive the $0.50 for the beverage. The payments can be made to each participant business at predetermined periods of time. For example, payments can be made monthly, bi-monthly, weekly, daily or any other predetermined period of time.

Figure 13:
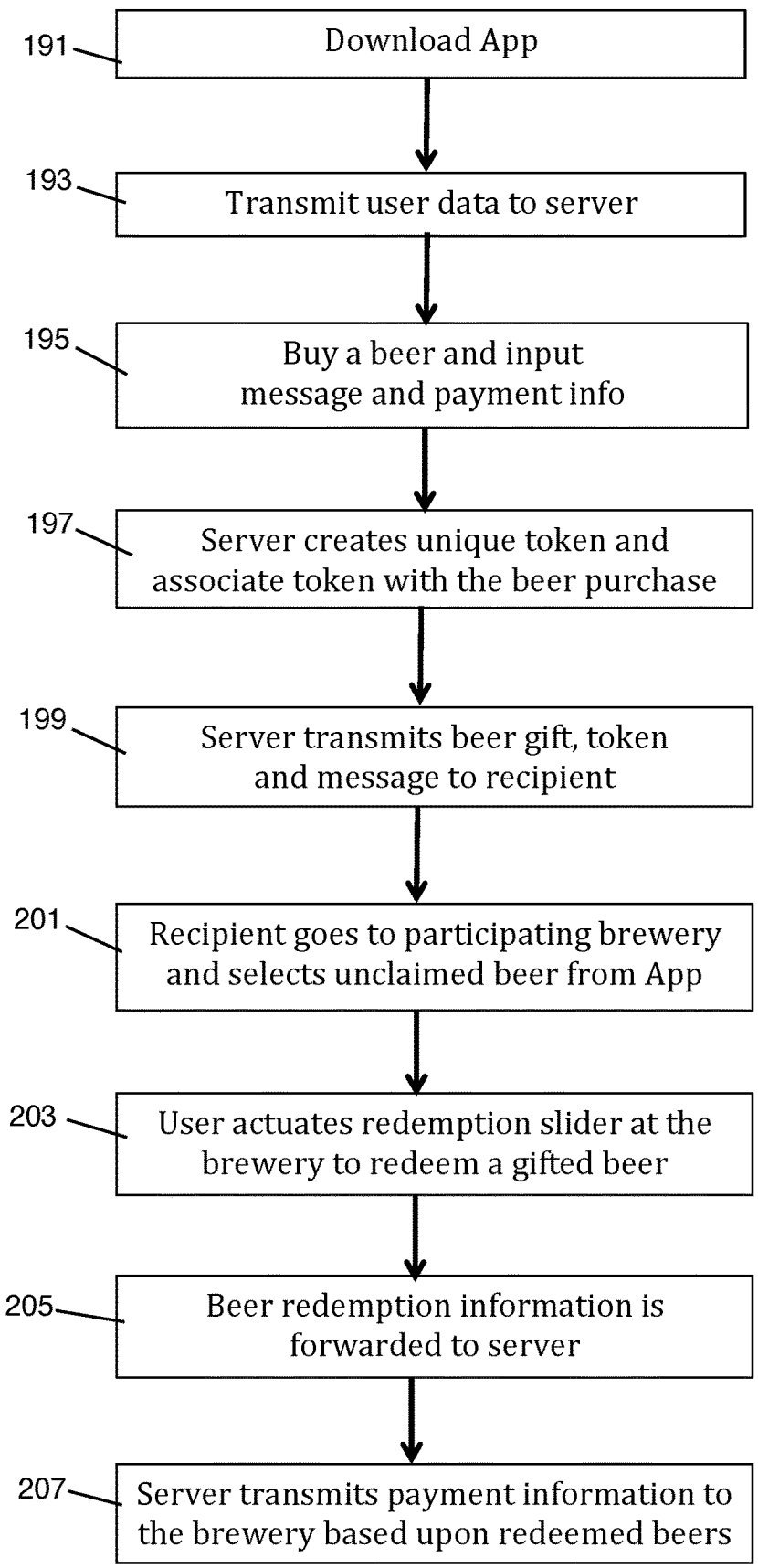
FIG. 13 illustrates an embodiment of a flowchart for the gifting process.

With reference to FIG. 13, the process for purchasing, receiving and redeeming a beer gift can be represented by a flow chart. The system users download an app from the server to a mobile computing device 191. User data is then input to the user's mobile computing device and the user data is transmitted to the server 193. When a user purchases one or more beers through the app, the system registers the purchase into the servers 195. The server creates a unique token that is associated with the beer purchase 197. The server then communicates with the user database to record the purchase of the beer. The beer credit is logged into the database and the app transmits the beer purchase information to the server. The server then transmits the beer gift, the associated token and the message from the gift sender to the user's mobile computing device with the gift expiration date and identification information for the sender of the beer 199.

The gift recipient customer receives the beer credit and goes to a participating brewery and selects an unclaimed beer from the app's UI 201. In an embodiment, the gift recipient customer can redeem the gifted beer by sliding the redemption slider in the presence of a server at a brewery or restaurant 203. When a customer redeems their beer credit, the user's computing device transmits the beer redemption information to the system servers 205. The information that is transmitted to the server in this embodiment can include the brewery the beer was redeemed at, date of redemption, number of credits redeemed, original price of the credits redeemed, and the value to the user of redeemed credits. The system can calculate the amount of money owed to each brewery and restaurant based upon the number of beers that have been redeemed and the value of each beer. The system can transmit payments to the breweries and restaurants based upon the calculated redeemed beers 207.

Figure 14:
FIG. 14 illustrates an embodiment of a listing of beverage merchants.

As discussed above with reference to FIG. 2, the system menu allows a user to see the list of participant breweries and restaurants in the proximity of the user. With reference to FIG. 14, the user has clicked on a brewery and a restaurant list button 211 and the UI 113 can display a listing of breweries and restaurants 209 around the user's location. The order of the listing 209 can be displayed in various different orders. In the illustrated example, the listing 209 order of the breweries and restaurants is based on the proximity of the user. The listing 209 can include the names of the breweries and restaurants with addresses, phone numbers and logos. In the illustrated example, the listing 209 includes logos for Bridger Brewing, Outlaw Brewing, White Dog Brewing and Dave's sushi as displayed.

Figure 15:
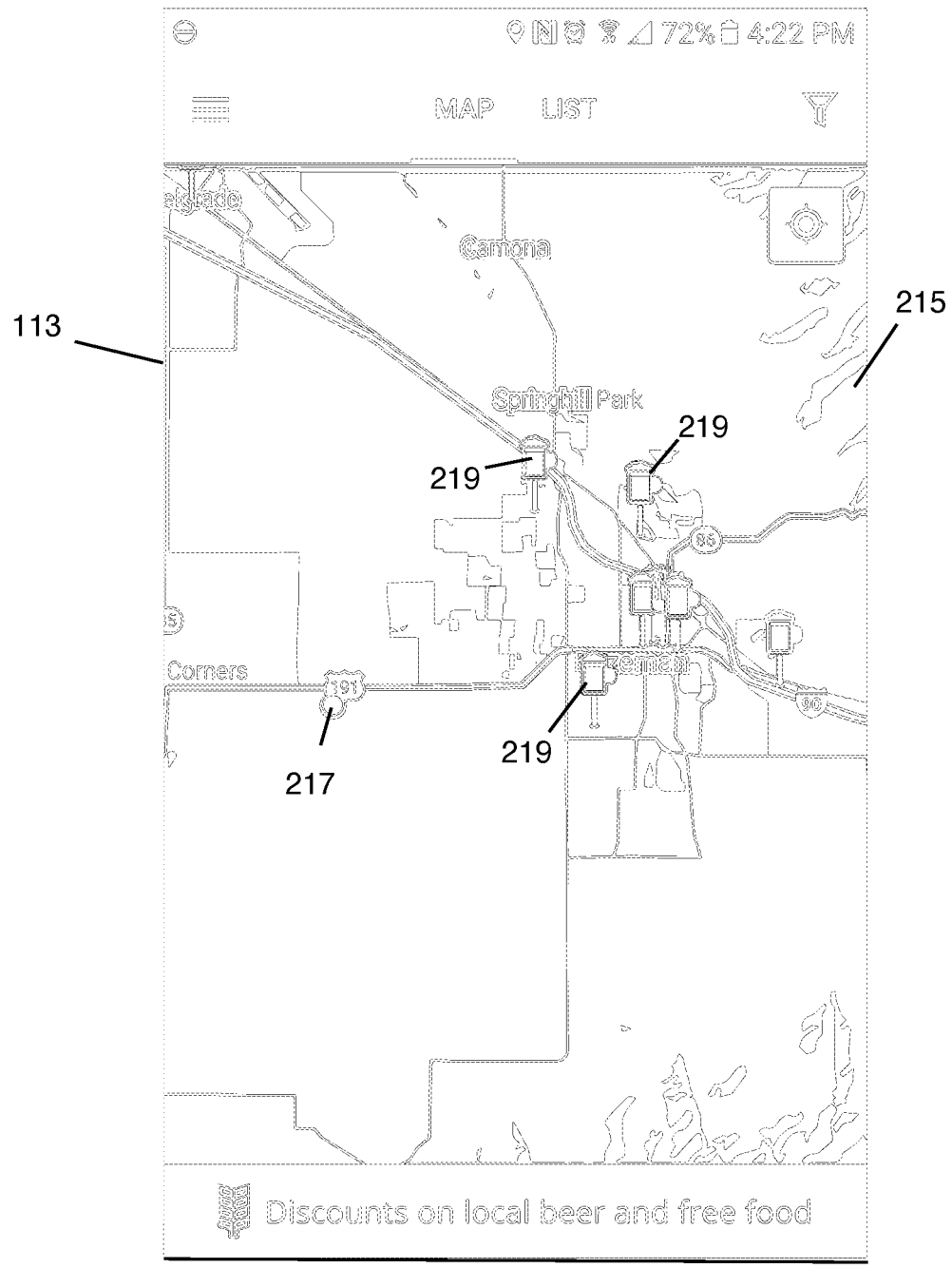
FIG. 15 illustrates an embodiment of a map showing the locations of beverage merchants.

With reference to FIG. 15, the user has clicked on a brewery and restaurant map button 213 and the UI can also display a map 215 showing a user's location as a circle 217 in this example and nearby restaurants can be shown as fork icons and breweries shown as mug icons 219. This can be useful in determining the locations or directions to destination breweries or restaurants. In other embodiments breweries and restaurants can be shown or represented by location pins with or without their logo.

Figure 16:
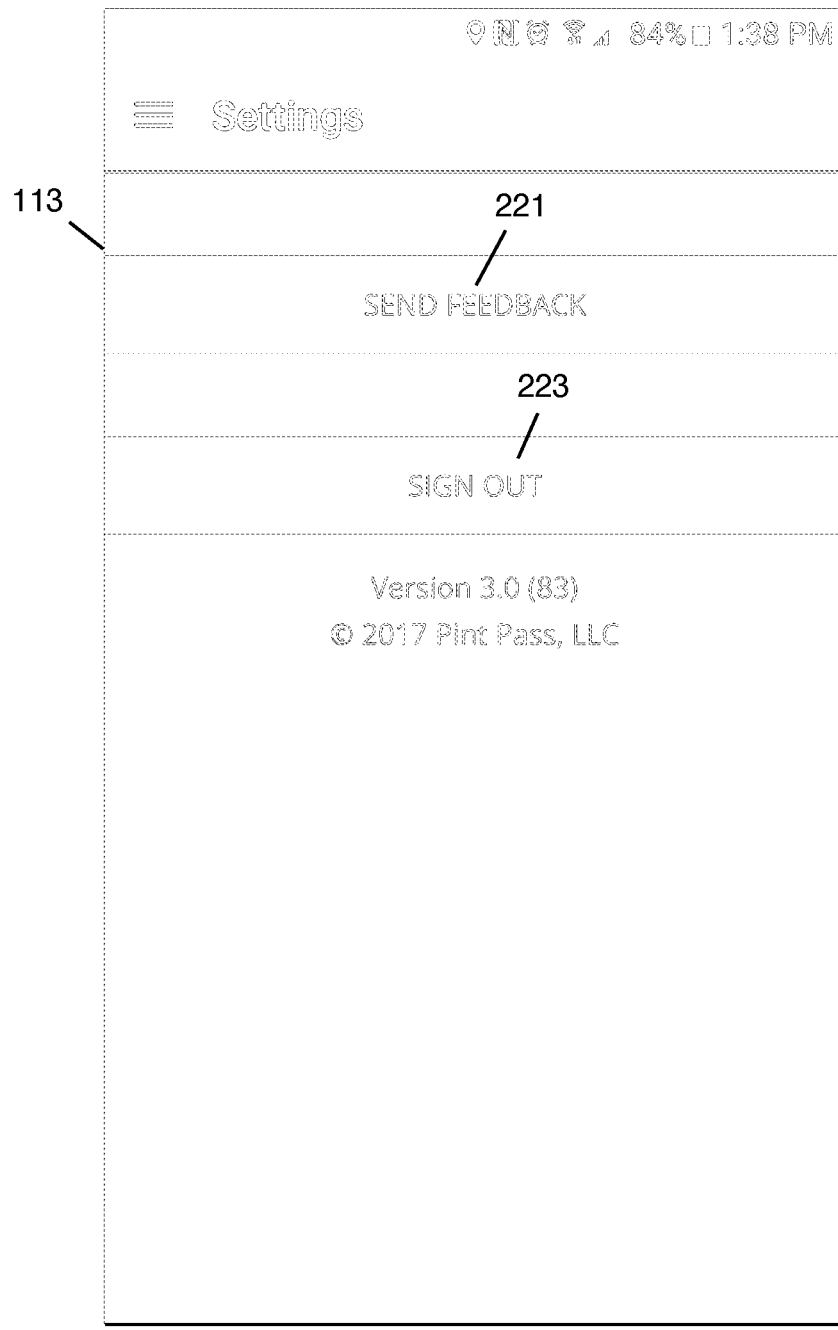
FIG. 16 illustrates an embodiment of a feedback and sign out page.

As discussed above with reference to FIG. 3, the system menu allows a user to change the system settings. With reference to FIG. 16 a simple example of a settings page is illustrated. The user can click on the "SEND FEEDBACK" button 221 to write on the UI 113 and send feedback to the system administrator. The user can click the "SIGN OUT" button 223 to stop using the app and conserve the computing device's processing resources. In future embodiments, additional app control settings will be added. For example, if a user has specific preferred breweries, the system can only list the preferred breweries. Alternatively, the system can be configured in the settings to display breweries in close proximity to the user's home or previously designated location rather than current location.

Program Membership:

In an embodiment, the inventive system can be part of a program such as PintPass which is a hyper-local & hyper-focused free phone/web application with an optional paid monthly or annual membership. The program can aggregate craft beers, breweries and hand selected restaurants, but takes the unique approach of getting competing breweries to link arms on a common loyalty, discount, and info-sharing platform, that is the PintPass Membership. A PintPass Membership is unique in that it offers discounts for craft beer drinkers from breweries and the local restaurants that serve their beer. Unlike discounts from singular breweries or restaurants, a PintPass Membership offers discounts at all PintPass member breweries and restaurants in the U.S. with a single membership.

Figure 17:
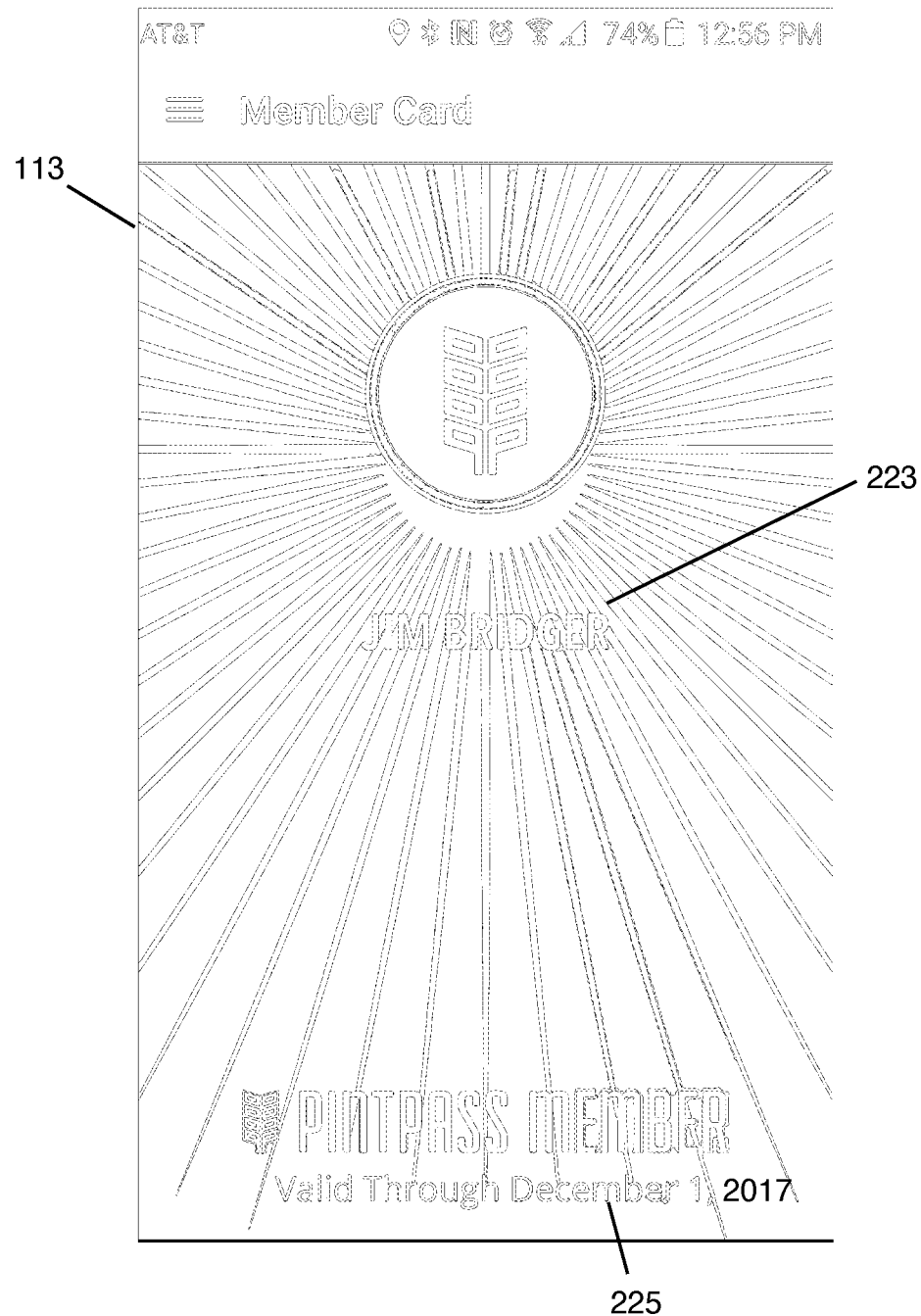
FIG. 17 illustrates an embodiment of a gift program membership page.

FIG. 17 illustrates an example of a user's digital membership card displayed on the UI 113 on a mobile computing device such as a smart phone. The users can display their membership card at any of the member breweries and restaurants to receive member discounts. The digital membership card can include the name of the member 223 and the expiration date 225 of the membership. In this example the name of the member 223 is "Jim Bridger" and the PintPass membership is valid through Dec. 1, 2017.

Figure 18:
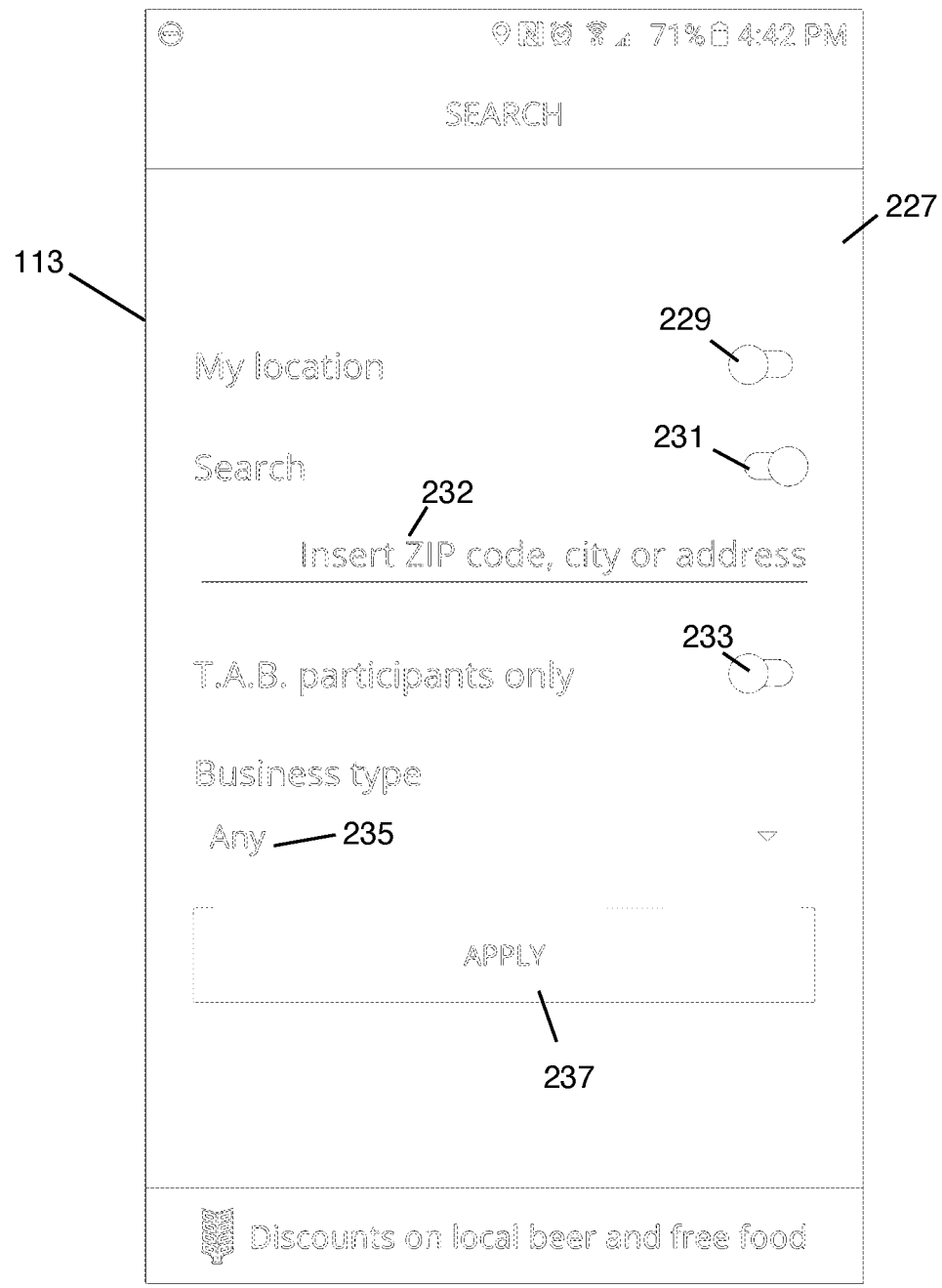
FIG. 18 illustrates an embodiment of a gift program merchant search page.

In an embodiment as illustrated in FIG. 18, the user can use the system to display the search results for bars, breweries, and restaurants based upon the UI settings configuration. The UI 113 can include a search page 227 that allows users to search for a brewery based on their address or to sort the brewery list by proximity. In this example, the search function can be based upon a user's location and/or address. If a user wants the system to display search results based upon the user's location, the user can actuate the "My location" button 229. If the user wants to display search results based upon a user specified location, the user can actuate the "search" button 231 and input location information 232. The user can also configure the system to output listings based upon the user's screened businesses. The user can click the Text A Beer (TAB) participants only button 233 if the user only wants to see restaurants and breweries that are participating in the TAB program. The user can use the "Business type" input 235 to display and select a menu of different types of establishments such as: breweries, restaurants, bars, etc. and select the type of business to be searched. The user can click the "Apply" button 237 to activate the selected search parameters.

As discussed, the UI can list breweries or other establishments. The server database can include various information about each of the breweries which can be accessed by the system users. When a user clicks on a member brewery in the brewery list, they see a brewery information screen. For example, with reference to FIG. 19 a user has selected "MAP Brewing" and the UI 113 can display a home page 239 for a member brewery MAP Brewing. From here, they can see information about the brewery, the beer list, and the kind of member benefits that the brewery offers. It also allows a user to get directions to the brewery or to contact them directly.

Figure 19:
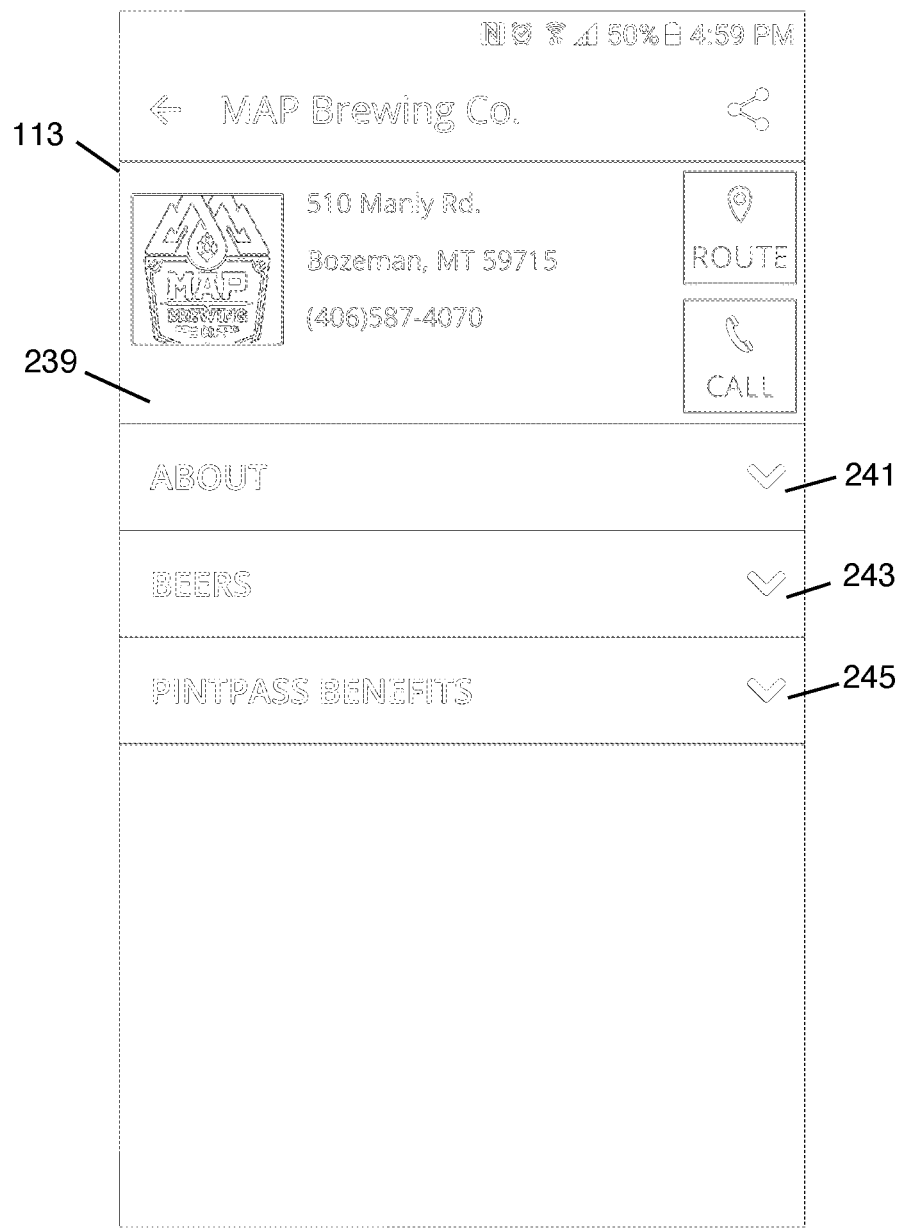
FIG. 19 illustrates an embodiment of a gift program merchant information page.

With reference to FIG. 19, a user has selected "MAP Brewing" on a prior UI screen and the server has sent MAP Brewing information to the user's computing device. The UI 113 can display a home page 239 for MAP Brewing that can include address, phone number, directions and contact features. In this example, additional information "About" and "Beers" have been clicked and are now displayed. The user can click on buttons about 241, beers 243 and benefits 245.

Figure 20:
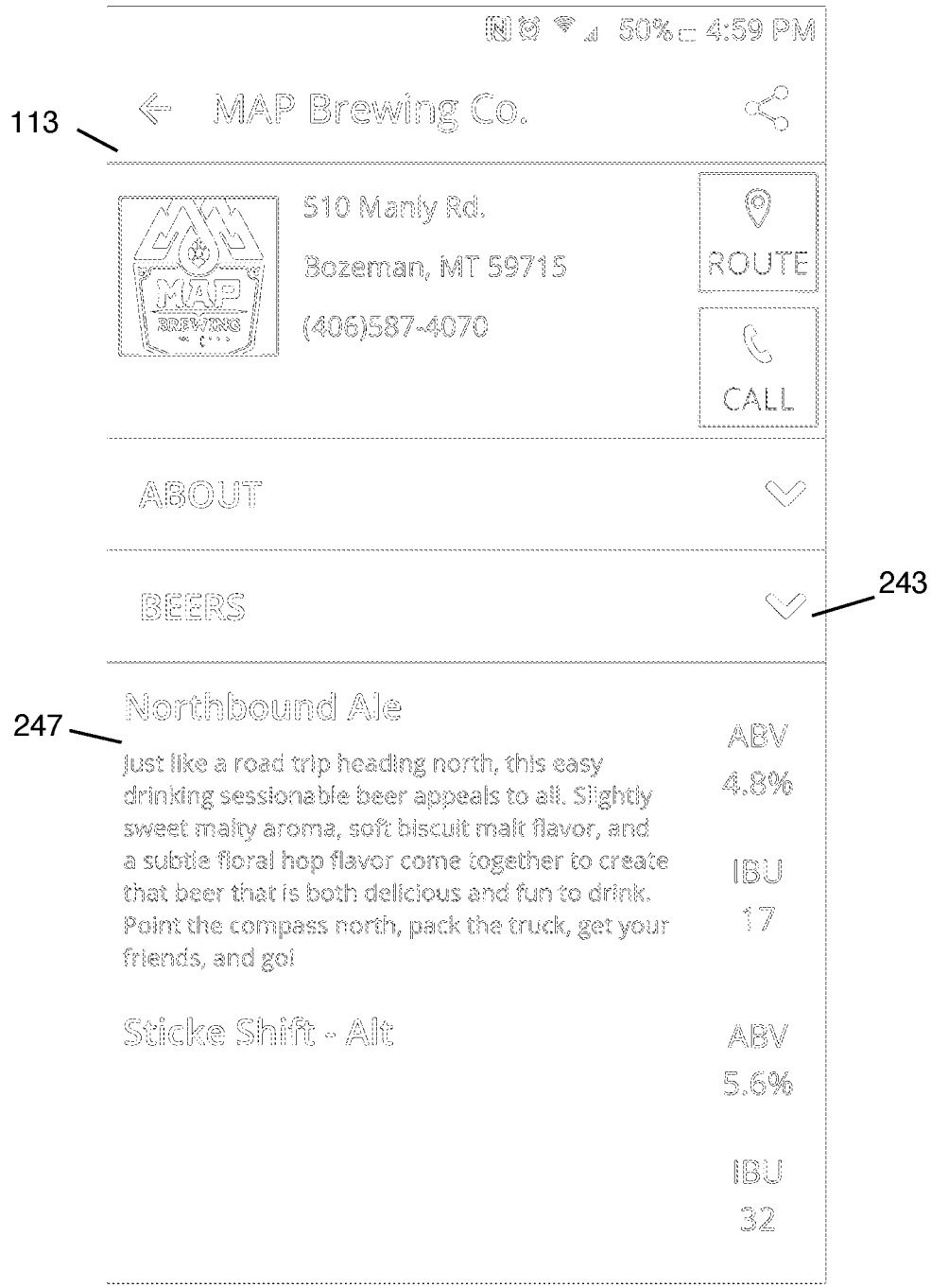
FIGS. 20 and 21 illustrate embodiments of beverage description pages.
Figure 21:
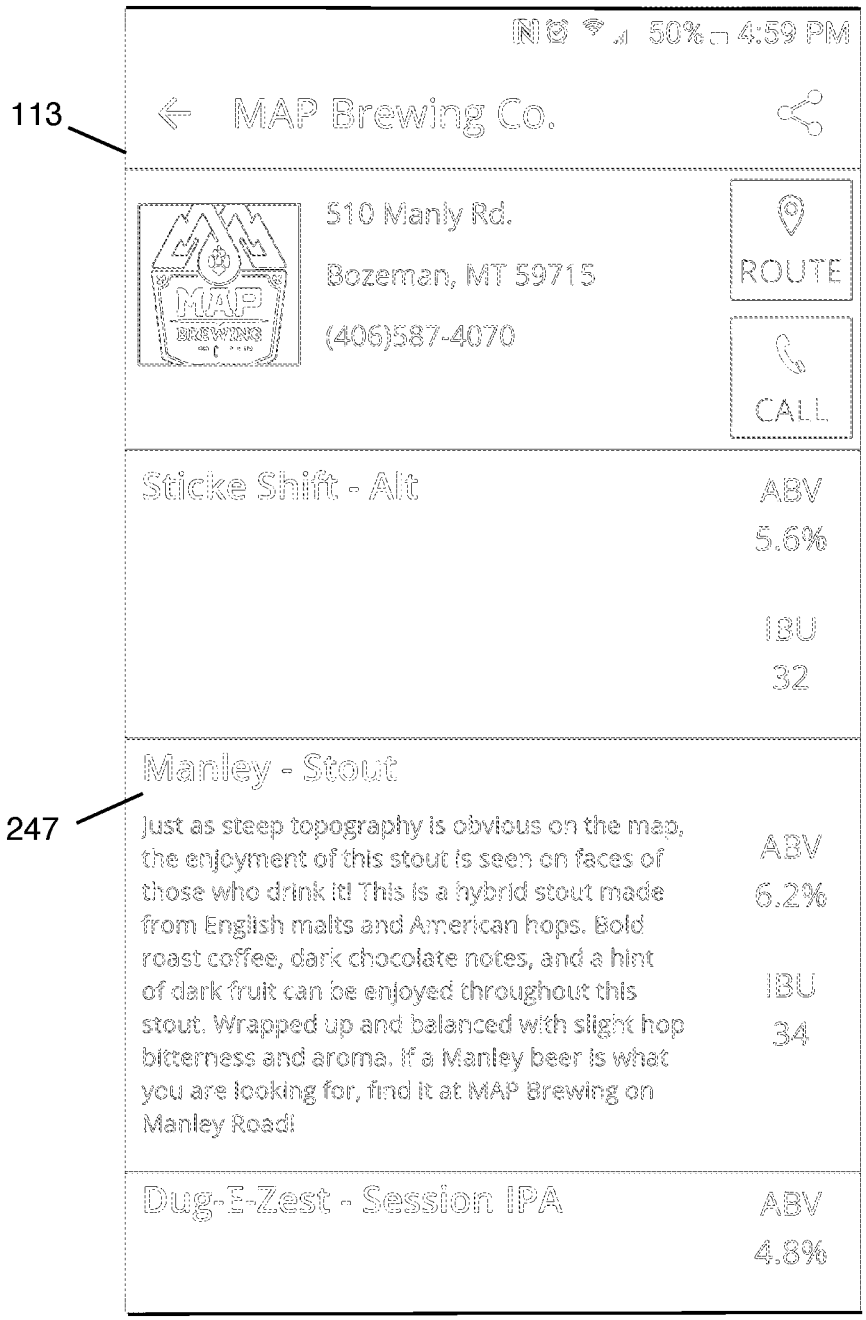

With reference to FIGS. 20 and 21, the user click on the beers button 243 and a listing of beers provided by MAP Brewing can be displayed. The user can scroll through the Beer section 247 for more information about more beers. The UI 113 can also display the member brewery's "Pint-Pass Benefits." If the user clicks on the PintPass Benefits button, the UI can display the membership benefits. For example, members can be used for free or discounted purchases of first pint and/or first growler fill, per day. In other embodiments, the PintPass benefits can change based upon the date, time or breweries desired increased discount. For example, the brewery may offer larger discounts on Mondays and smaller discounts on weekends. These changing benefits can be automatically updated and indicated on the system UI 113.

Figure 22:
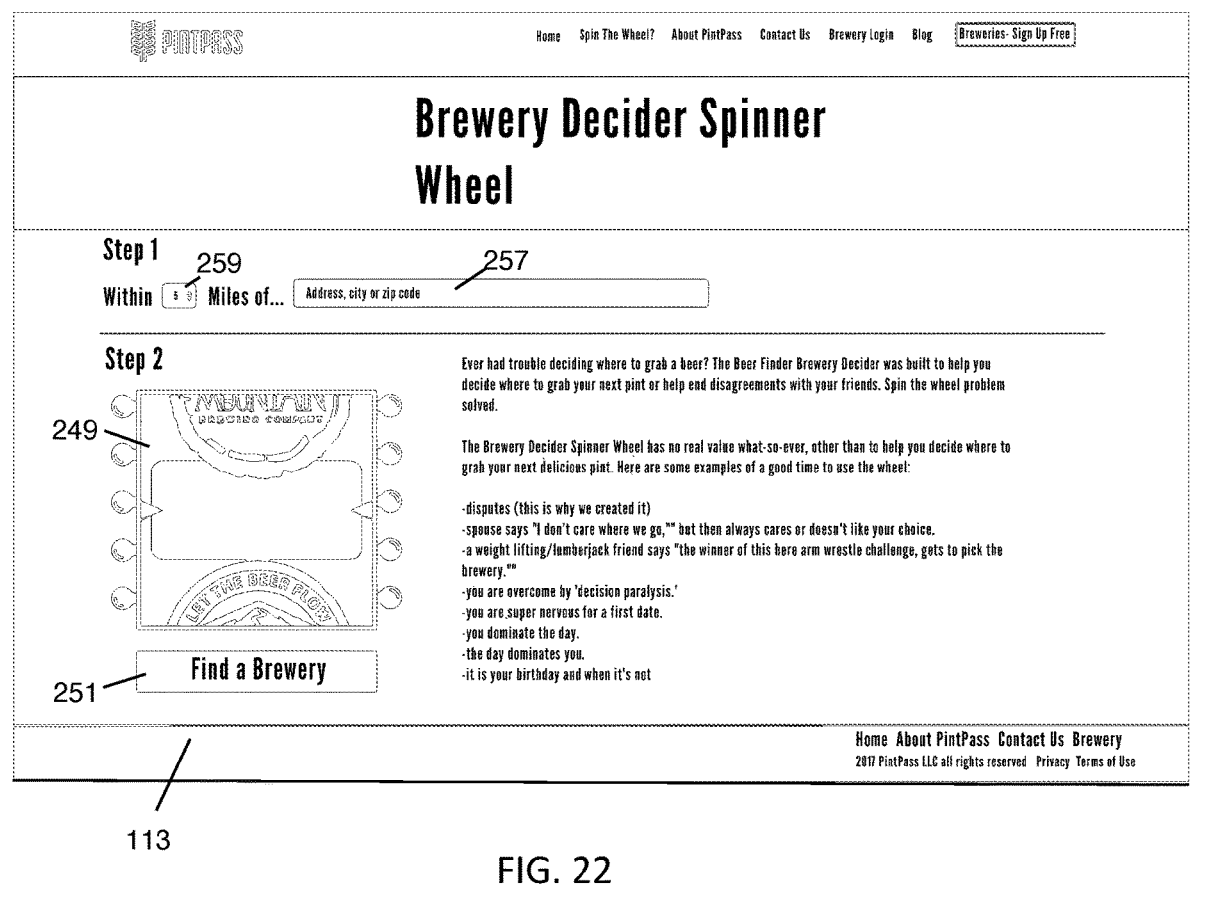

The app software downloaded to the user mobile computing devices can have additional features. With reference to FIG. 22, UI 133 of the app program can include: a location controls and a "spinner wheel" 249 that can have a plurality of different breweries, restaurants, beers, food, etc. In the illustrated embodiment, a plurality of breweries are listed on the spinner wheel 249. The location control can include an input for a location 257 and a radius distance 259 from the input location. The user can click a spin button 251, which causes the spinner wheel 249 to rotate. The spinner wheel 249 will stop rotating after a period of time and one of the breweries will be displayed on the spinner wheel 249.

In other embodiments, the inventive gifting system can be used in venue contests at stadiums and specific event venues. As an example of a contest, the stadium can broadcast an announcement for a contest on a public address system and display the contest information on video boards. In this example, the contest may be for free beer to a randomly selected contestant. To enter the contest, the user may need to text a specific code phone number to be entered to win free promotional items (i.e. free food items or beverages). The contest system can include servers that communicates with a database to store all incoming phone text numbers from a plurality of mobile computing devices, allocated contest winners and notify all participants of the results.

Figure 23:
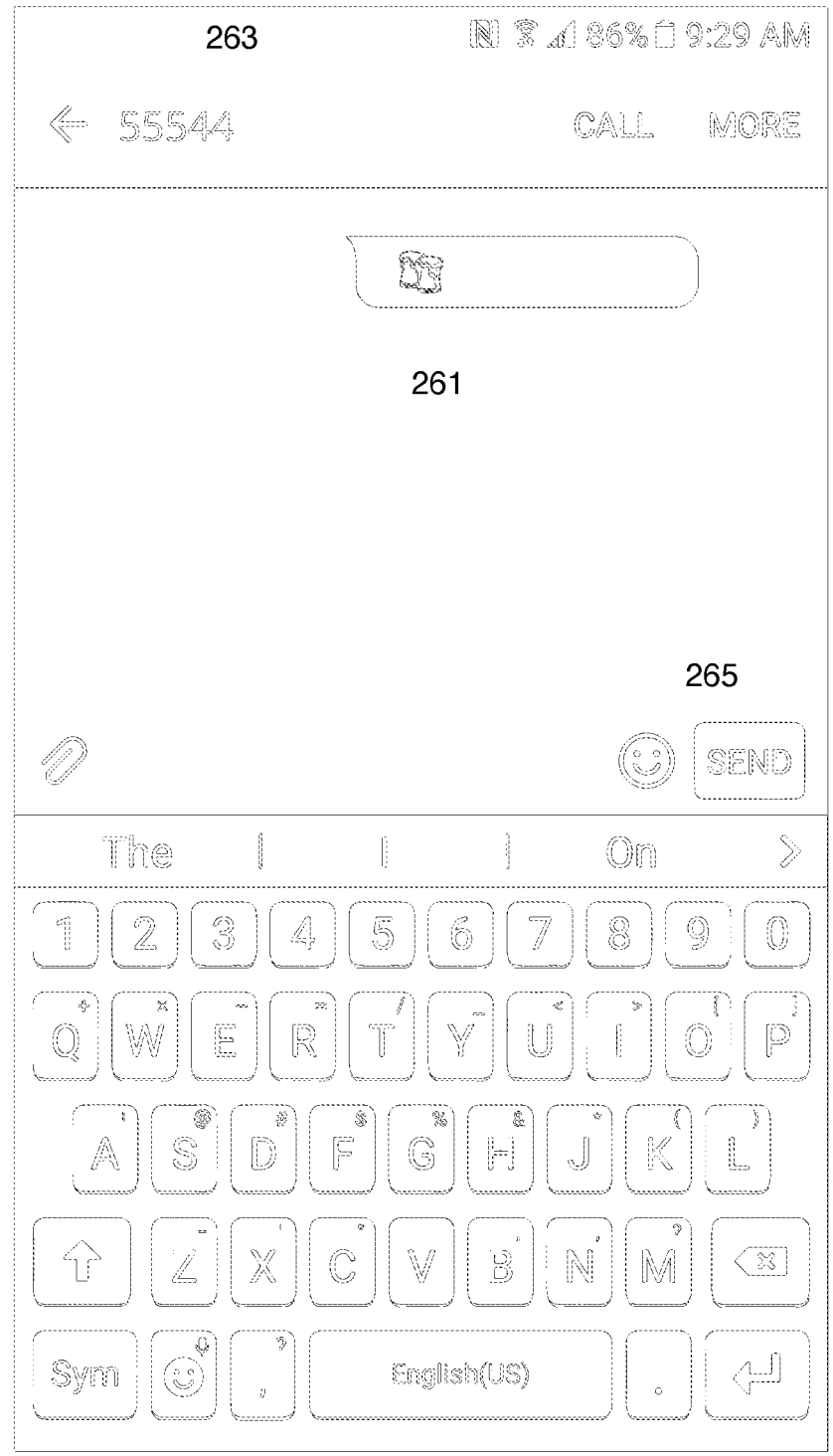
FIG. 23 illustrates an embodiment of a contest entry text.

FIG. 23 shows how a fan would enter the contest by texting a code 261 to a contest number 263 on a mobile computing device. In this example, the code 261 can be a beer mug icon and the contest number 263 can be "55544". The user can press the send button 265 to transmit the text code 261 to the contest promoter.

Figure 24:
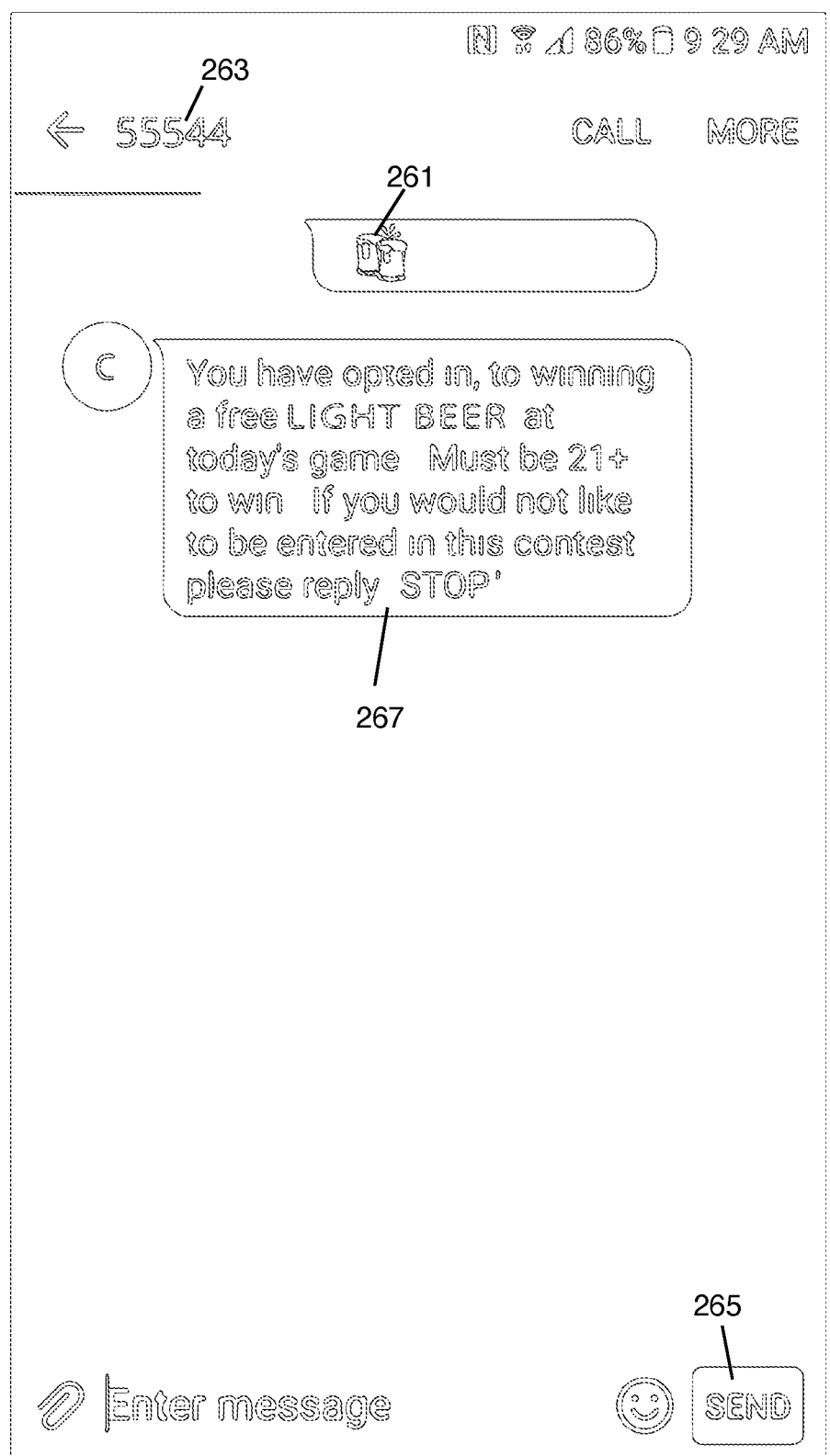
FIG. 24 illustrates an embodiment of a contest entry confirmation text.
Figure 25:
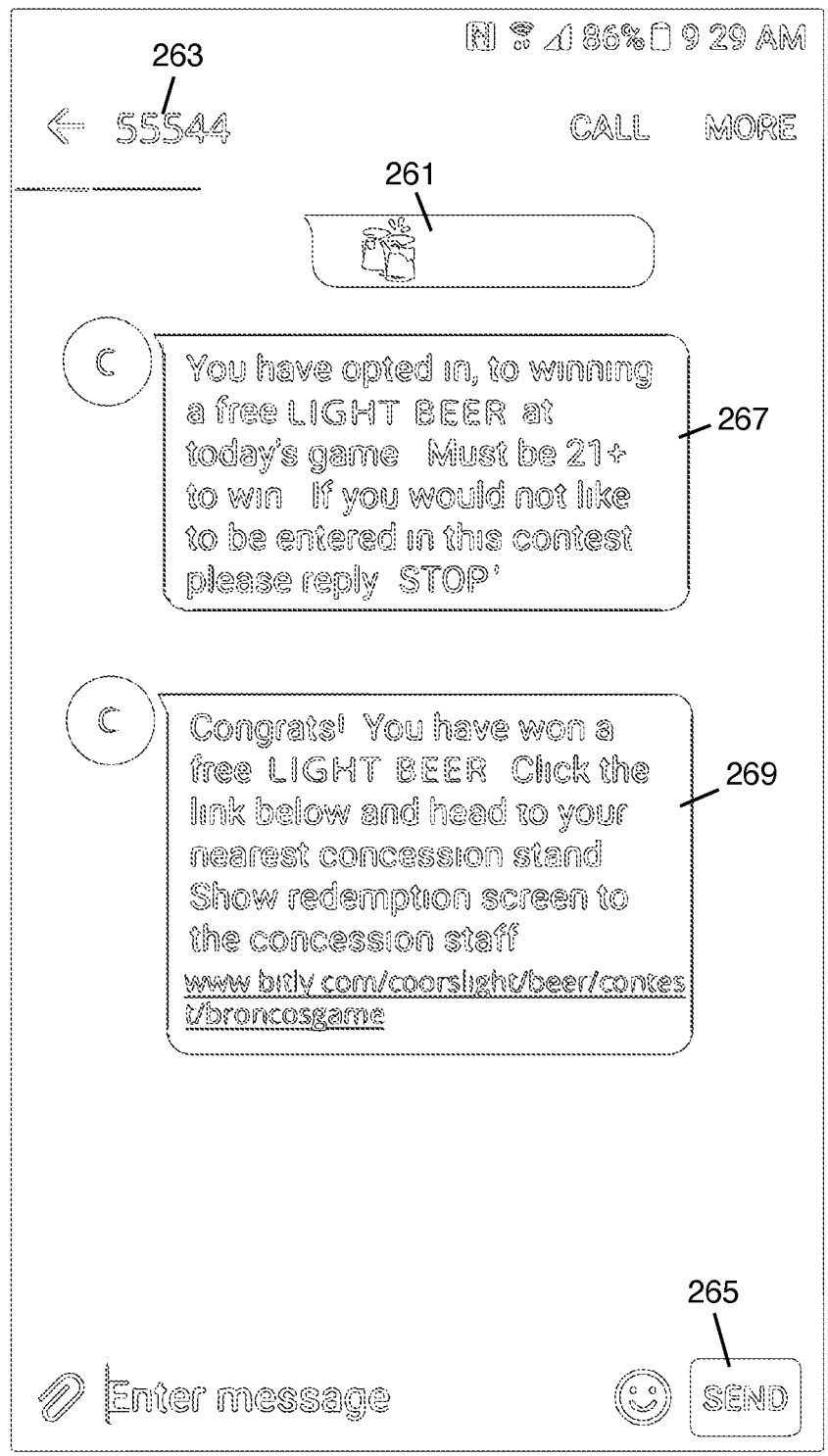
FIG. 25 illustrates an embodiment of a contest win confirmation text.
Figure 26:
FIG. 26 illustrates an embodiment of a contest prize redemption page.
Figure 27:
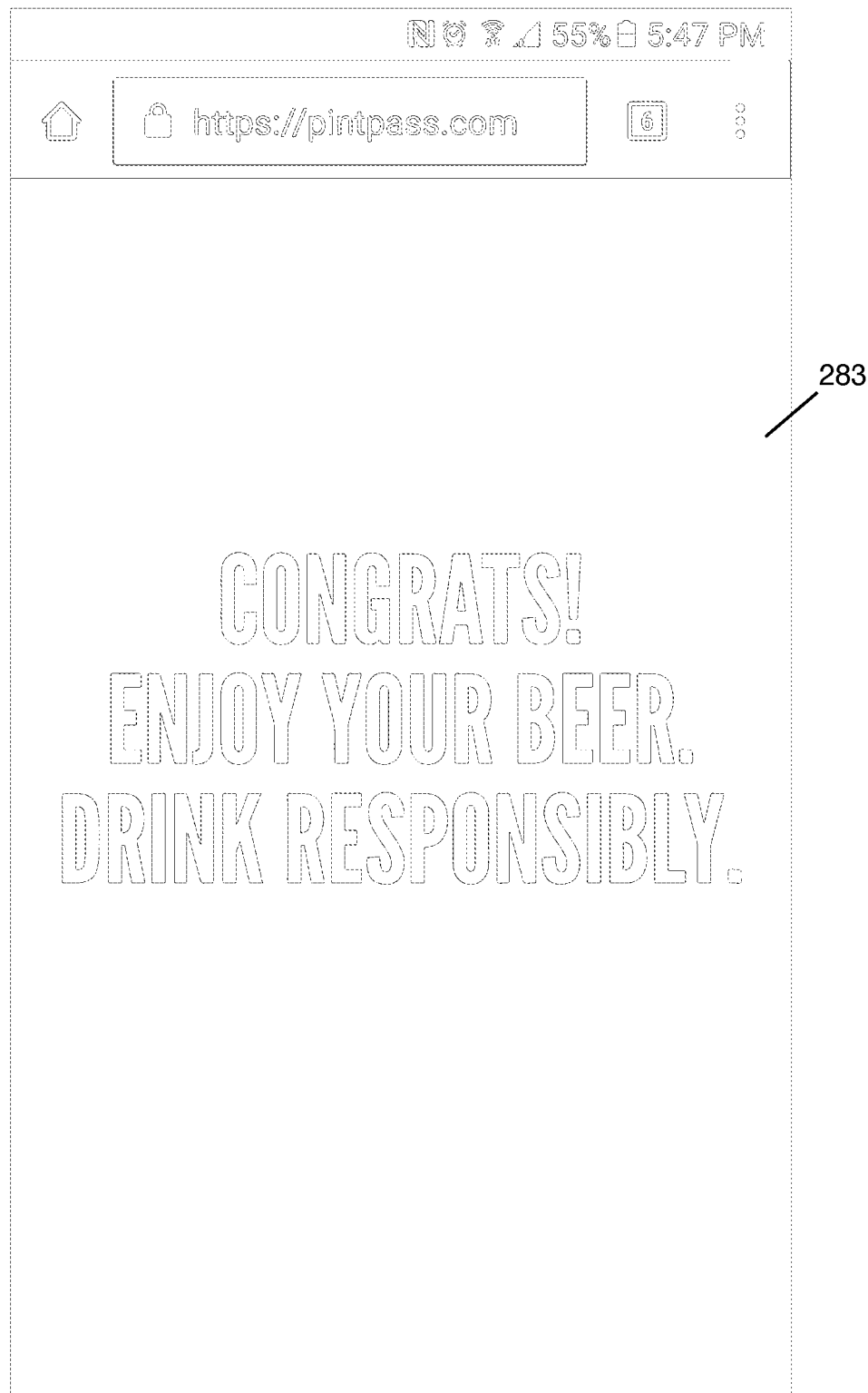
FIG. 27 illustrates an embodiment of a post prize redemption page.

With reference to FIG. 24, the contest system can respond to the contest entry text, with an contest entry confirmation 267. In this example, the contest system can transmit a confirmation 267 response text to the fan entering the contest and starting the process to win a free beer or item of food. With reference to FIG. 25, the winning text message 269 was sent to the contest participants who have won the contest. The winning text message 269 can notified the appropriate fans that they have won a free beer and provide a hyperlink 271 to a contest win redemption screen. With reference to FIG. 26, when the user clicks on the hyperlink, the mobile computing device's browser can go to a redemption screen 273 that includes a congratulations message 275, contest redemption instructions 277, redemption controls 279 and an expiration date and time 281. The contest winners can view the to redemption instructions 277 which state that the user must show the redemption screen 273 to a concession staff before redeeming the prize. The contest winners will also be informed of the expiration date and time 281. The contest winner can use the same redemption process described above with reference to FIG. 10. The contest winner can bring the mobile computing device to a designated redemption location such as a concessions stand at a stadium. In the presence of a contest staff member, the contest winner can slide the redemption bar to redeem the contest award. In this example, a beer has been redeemed and contest system can record the contest redemptions in a contest database. FIG. 27 shows the final screen 283 in the redemption process notifying contest participants they have successfully redeemed their free beer. The text messages between the contest participants and the contest system can be recorded in a database to account for all contest redemption and all contest entry data.

The TEXT-A-BEER methods and systems can also be used in venue contests. FIG. 23 shows how a fan would enter the contest. In this example, the user is using a text messenger app to text a two beer icon to a context phone number "55544". FIG. 24 shows our response to the fan entering the contest and starting the process to win a free beer or item of food. A contest server can respond to the entry by transmitting a message 267 confirming contest entry, contestant requirements, and instructions for being removed from the contest. In this example FIG. 25 shows the third step in the process where our system has allocated winners and notified the appropriate contestants they have won a free beer. The winning message 269 can include a hyperlink to claim the contest award. Once the fan has been notified of their winnings they click the link in the last text message 269. FIG. 26 shows the UI of the app on the computing device which can be a redemption page for contest winners to view and redeem their winnings. This process can be the exact same redemption process used in the PintPass app's TEXT-A-BEER process. The UI screen displays instructions for the winning user to show a concession staff at the venue the UI screen before redeeming. After the user has shown the concession staff the UI screen, the concession staff can confirm the award and the user can slide the redemption bar the beer has been redeemed and PintPass records the redemption in the system server. FIG. 27 shows the final screen in the redemption process notifying contest participants they have successfully redeemed their free beer.

In other embodiments, the software running on the mobile computing device can include additional features based upon participation with interactive surveys and loyalty.

These participation activities can result in points awards for the participants. The earned points can be used to redeem for beer and/or gifts.

In an embodiment, the UI on the mobile computing device can display a survey for the system user. The survey can be implemented in the following manner. Upon entry and check-in at a new brewery location, the mobile computing device can detect the location of the user in the new brewery location. The software can respond to the detected location by asking the user to take a survey which can consist of up to 10 questions. The UI can display the questions and the user can input the answers. The survey questions can cover various questions such as the Brewery Environment and Beer Preferences. The user input data from these survey questions can be collected and stored in a server database. The survey data can be shared with the brewery and used to improve the brewery's customer knowledge and possibly improve the brewery's business. The surveys can include individual brewery specific questions that are specifically related to the brewery that the user is at as well as more generic brewery questions related to beer in general such as the user's beer preferences.

Users are motivated to complete the surveys through the rewards system because the system allows users to earn "points" on the completion of each survey. Points allocated per survey can vary based on any specials that are being run at the brewery where the survey is being taken. The UI can display the predetermined number of points required to purchase different beers and gifts. The points required to purchase the beer and/or gifts can be proportional the dollar value of the beer and/or goods. The points can be accumulated by the system users and then be redeemed for beer or gifts through the app as described above.

In an embodiment, the system can have two forms of "payment" that can store points and or money and be used to make beer and/or gift purchases. The first is T.A.B. where users can place real US Dollars onto their electronic account and the second is earned points which are earn by completing surveys or other tasks that can be provided when the users check in the Breweries that are also stored in their electronic account. Both forms of payment can be used alone or in combination with each other so that beers and/or gifts can be purchased or gifted partially in points and partially in dollars. In an embodiment, the points may need to be redeemed within a predetermined set amount of time or the points can expire if they go unused after a predetermined period of time.

Figure 28:
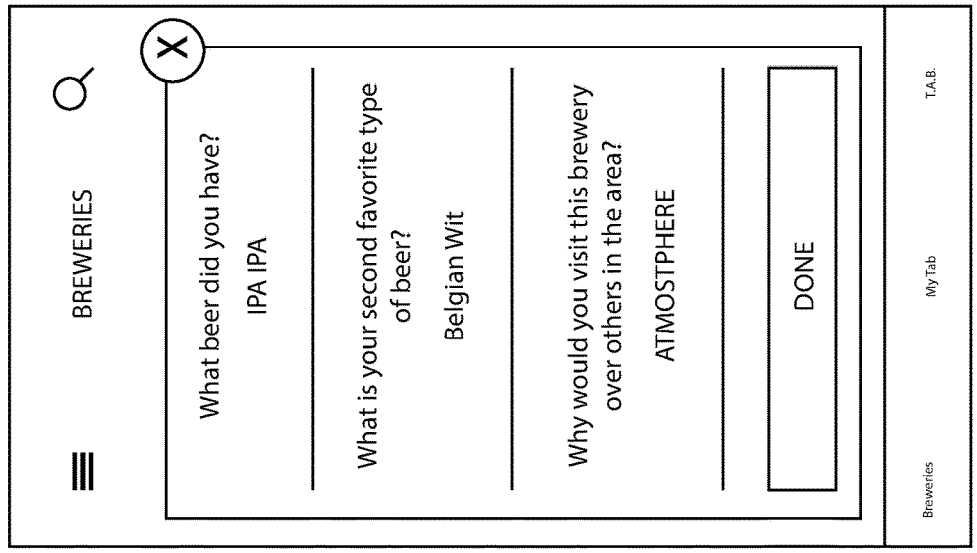

FIG. 28 illustrates a UI as the mobile computing device detects the location of the system user using sensors such as GPS or other location sensors or other receiver devices that can confirm that the computing device is at the brewery. Alternatively, the computing device can use other mechanisms such as WiFi or BlueTooth which can detect computer communication devices in the brewery. Setting up communications between the computing device and the communications devices in the brewery can also be used to confirm that the computing device is at the brewery. In this example, the user can wait while the computing device confirms the location of the user. Because each brewery can have their own surveys, the location may need to be determined before displaying the survey questions. At any time, if the user decides not to take the survey or earn points, the user can click on the close button 305.

Figure 29:
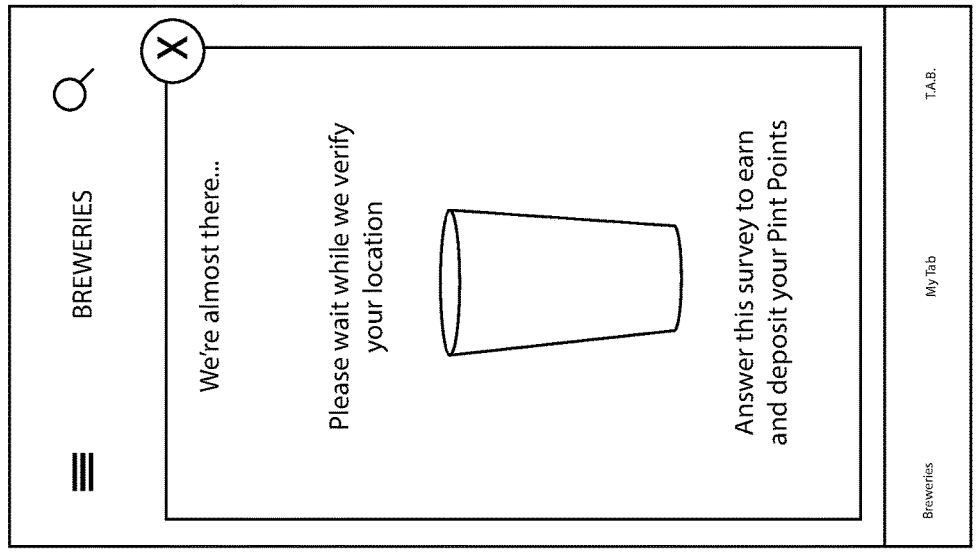

Once the location is verified, the brewery location can be determined and the survey(s) associated with the brewery can be downloaded from the server to the mobile computing device. FIG. 29 illustrates the UI which displays a plurality of questions with inputs. In this example, the first question is "What beer did you have?" 311 and the user has input the answer "IPA IPA" 321. The second question is "What is your second favorite type of beer?" 312 and the user has input the answer "Belgian Wit" 322. The third question is "Why would you visit this brewery over others in the area?" 313 and the user has input the answer, "Atmosphere" 323. When the survey is completed, the user can click on the "Done" button 331 and the survey answers can be transmitted to the system server and the survey answers can be stored on a database.

Figure 30:
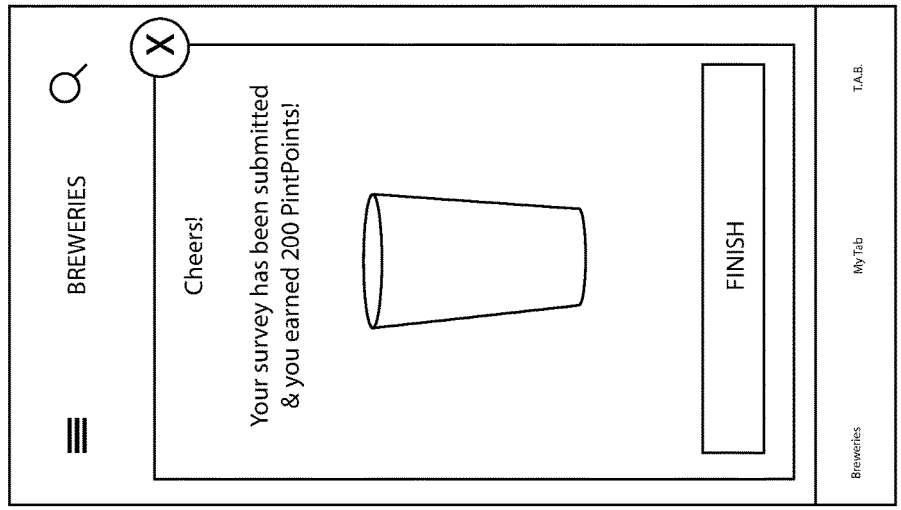

FIG. 30 illustrates a UI after the survey has been complete. The UI shows that the survey has been completing and submitted and the user has earned 200 points 341. The user can click on the "Finish" button 343. The UI can move to another screen once the finish button 343 is pressed.

Figure 31:
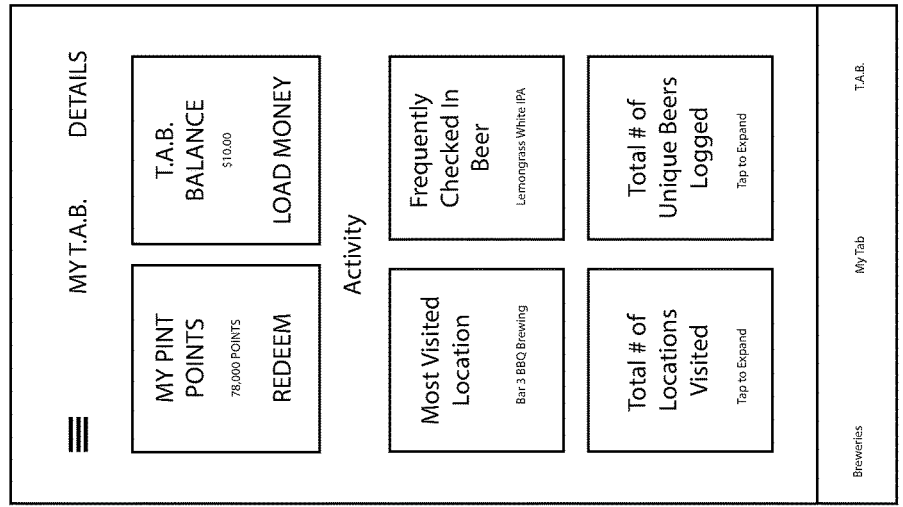

FIG. 31 illustrates a UI that shows the user's points information. In this example, the UI has a point section 401 that shows in this example that the user has earned 78,000 points. The point section 401 can have an integrated redeem button that can be pressed to redeem the earned points for beverages (or gifts). In an embodiment, the beers being sold at a brewery can have both a real money dollar purchase price and a points purchase price. Rather than using real money, the user can press the redeem button. The UI can respond by displaying a plurality of beer, beverage, or gift options. For example, a IPA IPA at the Bar 3 BBQ Brewery may list the IPA IPA as $7 in real money or 70,000 points. The user can select the redeem points option and select the IPA IPA on the beer options to spend 70,000 points. Once the brewery receives the points order, the server can provide the IPA IPA to the customer. Alternatively, the brewery can display the purchase and points prices for the beverages on a menu. The user can use the UI to electronically select and provide the required number of points to the brewery through the server to purchase the desired beverage. The redemption process has been described above.

The UI illustrated in FIG. 31 can also have a balance section 403 that shows the user's electronic cash funds. In this example that the user has an electronic account balance of $10.00. The balance section 403 can have an integrated button to allow the user to load more money into the electronic balance account. The user can also purchase beers with the funds in the electronic balance account. For example, the user can user $7 of electronic funds to purchase an IPA IPA. The redemption process has been described above.

The UI can also display additional user information including the most visited location 405 which is Bar 3 BBQ Brewing and the frequently checked in beer 407 which is Lemongrass White IPA. As discussed, the system can track the locations and beer purchases by the users. By analyzing the user data, the system can determine the most visited locations and the most frequently checked in beers for each of the system users.

The system can also track the total number of brewery locations visited by the user 409 and provide user information for the total number of unique beers 411 purchased by each of the users. By clicking on these buttons, the UI can display this information to the system user.

In yet another embodiment, the UI can be used to purchase beverages or other items with a combination of points and stored cash funds. In this example, 70,000 points can have the same value as $7.00. Thus, each dollar is equal to 10,000 points. The UI can allow the user to spend any combination of points and funds to meet the cumulative value of $7 or 70,000 points. For example, the user may use the UI to use a combination of $2.00 from the user's account balance and 50,000 points from the user's points balance to purchase the $7/70,000 point IPA IPA. The user can purchase the IPA IPA for user consumption or gift the IPA IPA to someone else as described above.

Figure 32:
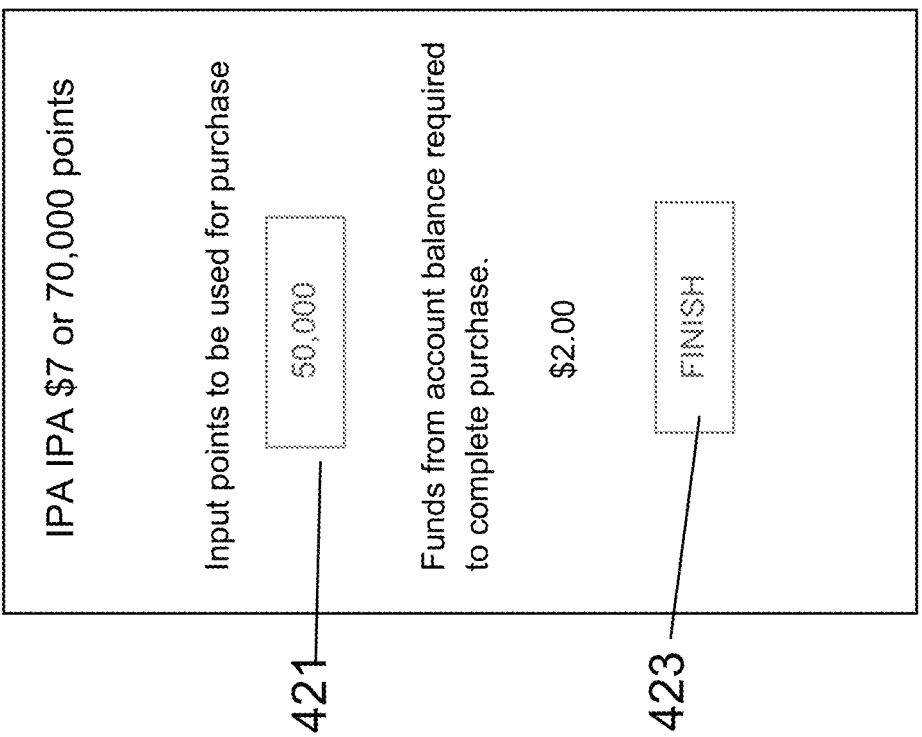

With reference to FIG. 32, the UI can ask the user to input the number of points that he or she would like to apply to the purchase. The UI can have a points input section 421. In this example, the user has input 50,000 points. The UI responds to the 50,000 points input by displaying the balance of funds required to complete the purchase. In this example, the system displays $2.00 as the required funds to complete the purchase. If the combination of 50,000 points and $2.00 in funds is acceptable, the user can then press the finish button 423 to proceed with the purchase of the IPA IPA. The user can purchase the IPA IPA for user consumption or gift the IPA IPA to someone else as described above.

Figure 33:
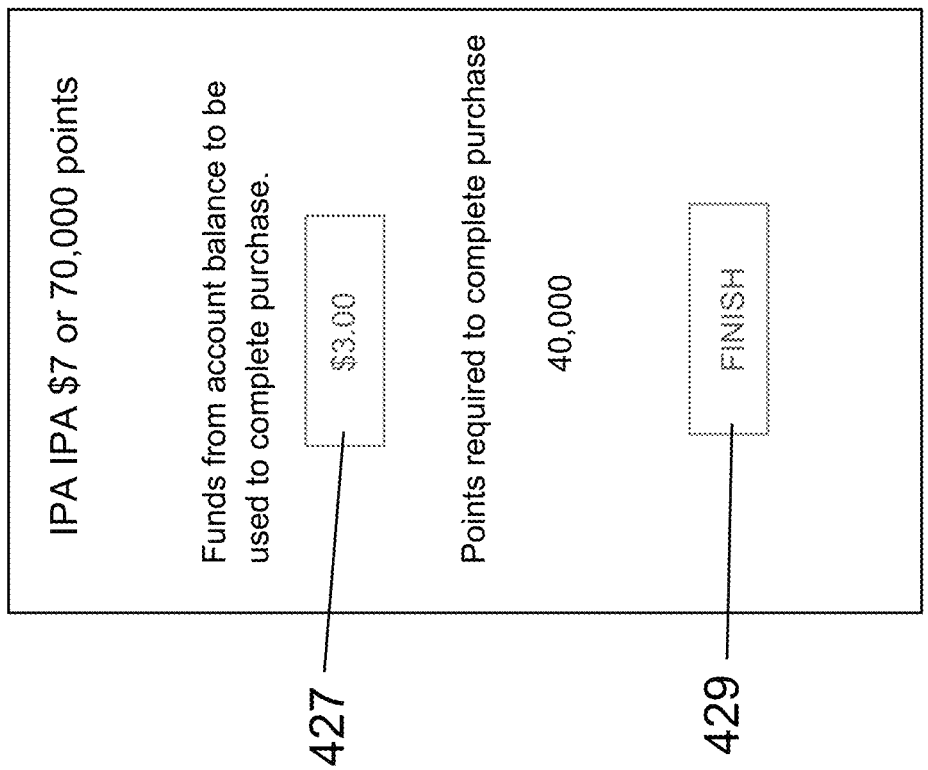

With reference to FIG. 33, the UI can ask the user to input the funds that he or she would like to apply to the purchase. The UI can have a funds input section 427. In this example, the user has input $3.00. The UI responds to the funds input by displaying the balance of points required to complete the purchase. In this example, the system displays 40,000 points as the required points to complete the purchase. If the combination of 40,000 points and $3.00 in funds is acceptable, the user can then press the finish button 429 to proceed with the purchase of the IPA IPA. The user can purchase the IPA IPA for user consumption or gift the IPA IPA to someone else as described above.

In other embodiments, a special UI interface tool can be used to control a first portion of the payment with money and a second portion of the payment with points. With reference to FIGS. 34 and 35, an example of a UI having a slide button 431 that can be used to control the values of the first portion of the payment with money and the second portion of the payment with points. By moving the slide button 431 up the payment can be adjusted to add more money and reduce the points being used. By moving the slide button 431 down, the payment can be adjusted to add more points and reduce the monetary funds. the In FIG. 34, the slide button 431 is in an upper position and the UI displays the money portion is $1.50 and the points portion of 55,000 points. If this division of funds and points is acceptable, the user can click on the finish button 435 to complete the purchase of IPA IPA. In FIG. 35, the slide button 431 is in a lower position and the UI displays the money portion is $6.00 and the points portion of 10,000 points. If this division of funds and points is acceptable, the user can click on the finish button 435 to complete the purchase of IPA IPA.

Figure 36:
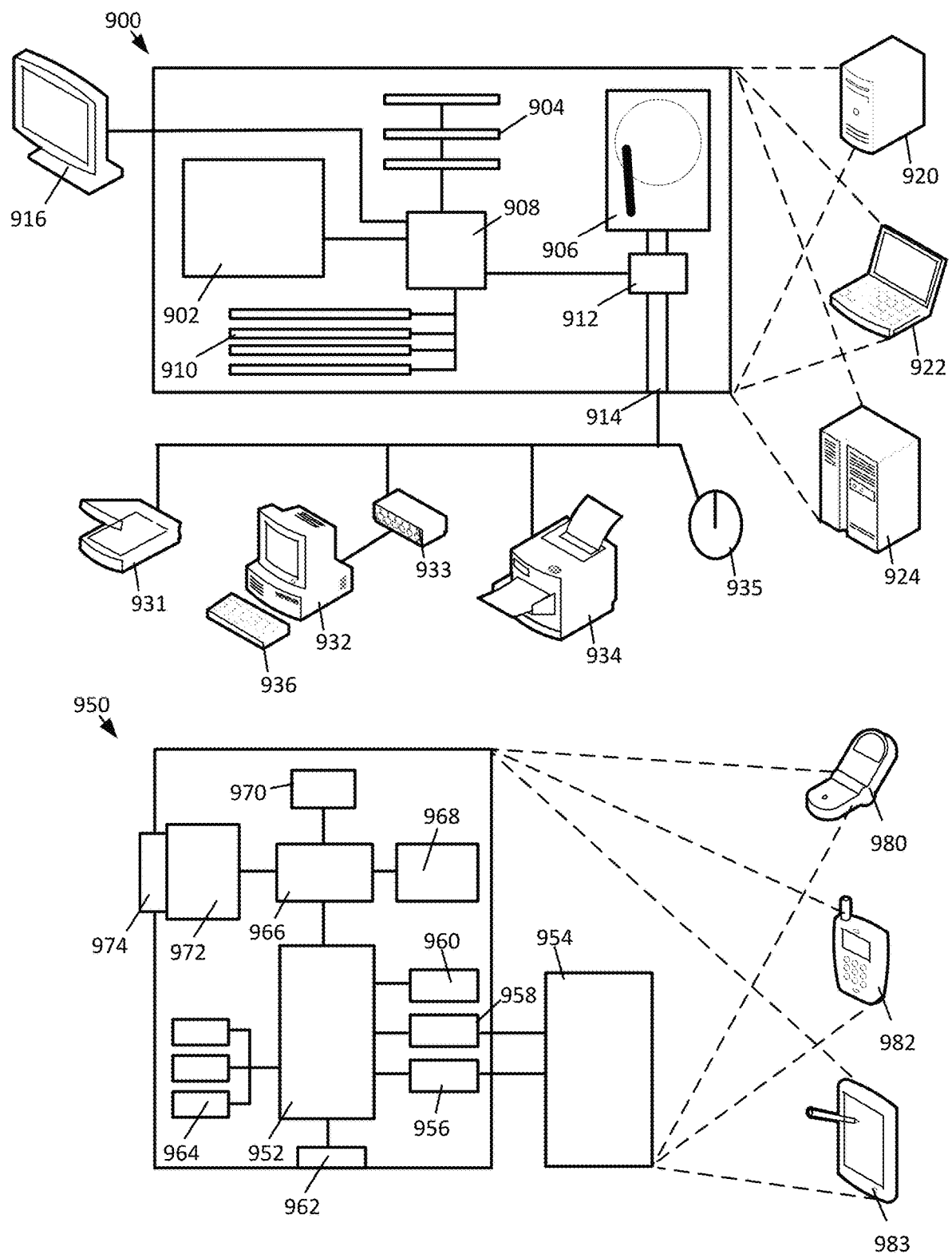
FIG. 36 illustrates an example of a generic computer system that can be used with the present invention.

FIG. 36 shows an example of a generic computer device 900 and a generic mobile computer device 950, which may be used to implement the processes described herein, including the mobile-side and server-side processes for installing a computer program from a mobile device to a computer. The computing device 900 is intended to represent various forms of digital computers, such as laptops, desktops, workstations, personal digital assistants, servers, blade servers, mainframes, and other appropriate computers. Computing device 950 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

Computing device 900 includes a processor 902, memory 904, a storage device 906, a high-speed interface 908 connecting to memory 904 and high-speed expansion ports 910, and a low speed interface 912 connecting to low speed bus 914 and storage device 906. Each of the components processor 902, memory 904, storage device 906, high-speed interface 908, high-speed expansion ports 910, and low speed interface 912 are interconnected using various busses, and may be mounted on a common motherboard or in other manners as appropriate. The processor 902 can process instructions for execution within the computing device 900, including instructions stored in the memory 904 or on the storage device 906 to display graphical information for a GUI on an external input/output device, such as display 916 coupled to high speed interface 908. In other implementations, multiple processors and/or multiple busses may be used, as appropriate, along with multiple memories and types of memory. Also, multiple computing devices 900 may be connected, with each device providing portions of the necessary operations (e.g., as a server bank, a group of blade servers, or a multi-processor system).

The memory 904 stores information within the computing device 900. In one implementation, the memory 904 is a volatile memory unit or units. In another implementation, the memory 904 is a non-volatile memory unit or units. The memory 904 may also be another form of computer-readable medium, such as a magnetic or optical disk.

The storage device 906 is capable of providing mass storage for the computing device 900. In one implementation, the storage device 906 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 904, the storage device 906, or memory on processor 902.

The high speed controller 908 manages bandwidth-intensive operations for the computing device 900, while the low speed controller 912 manages lower bandwidth-intensive operations. Such allocation of functions are exemplary only. In one implementation, the high-speed controller 908 is coupled to the memory 904, display 916 (e.g., through a graphics processor or accelerator), and to high-speed expansion ports 910, which may accept various expansion cards (not shown). In the implementation, low-speed controller 912 is coupled to storage device 906 and low-speed expansion port 914. The low-speed expansion port 914, which may include various communication ports (e.g., USB, Bluetooth, Ethernet, wireless Ethernet), may be coupled to one or more input/output devices, such as a keyboard 936 in communication with a computer 932, a pointing device 935, a scanner 931, or a networking device 933 such as a switch or router, e.g., through a network adapter.

The computing device 900 may be implemented in a number of different forms, as shown in the figure. For example, it may be implemented as a standard server 920, or multiple times in a group of such servers. It may also be implemented as part of a rack server system 924. In addition, it may be implemented in a personal computer such as a laptop computer 922. Alternatively, components from computing device 900 may be combined with other components in a mobile device (not shown), such as device 950. Each of such devices may contain one or more of computing device 900, 950, and an entire system may be made up of multiple computing devices 900, 950 communicating with each other.

Computing device 950 includes a processor 952, memory 964, an input/output device such as a display 954, a communication interface 966, and a transceiver 968, among other components. The device 950 may also be provided with a storage device, such as a Microdrive, solid state memory or other device, to provide additional storage. Each of the components computing device 950, processor 952, memory 964, display 954, communication interface 966, and transceiver 968 are interconnected using various busses, and several of the components may be mounted on a common motherboard or in other manners as appropriate.

The processor 952 can execute instructions within the computing device 950, including instructions stored in the memory 964. The processor may be implemented as a chipset of chips that include separate and multiple analog and digital processors. The processor may provide, for example, for coordination of the other components of the device 950, such as control of user interfaces, applications run by device 950, and wireless communication by device 950.

Processor 952 may communicate with a user through control interface 958 and display interface 956 coupled to a display 954. The display 954 may be, for example, a TFT LCD (Thin-Film-Transistor Liquid Crystal Display) or an OLED (Organic Light Emitting Diode) display, or other appropriate display technology. The display interface 956 may comprise appropriate circuitry for driving the display 954 to present graphical and other information to a user. The control interface 958 may receive commands from a user and convert them for submission to the processor 952. In addition, an external interface 962 may be provided in communication with processor 952, so as to enable near area communication of device 950 with other devices. External interface 962 may provide, for example, for wired communication in some implementations, or for wireless communication in other implementations, and multiple interfaces may also be used.

The memory 964 stores information within the computing device 950. The memory 964 can be implemented as one or more of a computer-readable medium or media, a volatile memory unit or units, or a non-volatile memory unit or units. Expansion memory 974 may also be provided and connected to the device 950 through an expansion interface 972, which may include, for example, a SIMM (Single In Line Memory Module) card interface. Such expansion memory 974 may provide extra storage space for device 950, or may also store applications or other information for the device 950. Specifically, expansion memory 974 may include instructions to carry out or supplement the processes described above, and may include secure information also. Thus, for example, expansion memory 974 may be provided as a security module for device 950, and may be programmed with instructions that permit secure use of device 950. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 964, expansion memory 974, memory on processor 952, or a propagated signal that may be received, for example, over transceiver 968 or external interface 962.

Device 950 may communicate wirelessly through communication interface 966, which may include digital signal processing circuitry where necessary. Communication interface 966 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 968. In addition, short-range communication may occur, such as using a Bluetooth, Wi-Fi, or other such transceiver (not shown). In addition, GPS (Global Positioning System) receiver module 970 may provide additional navigation- and location-related wireless data to device 950, which may be used as appropriate by applications running on device 950.

Device 950 may also communicate audibly using audio codec 960, which may receive spoken information from a user and convert it to usable digital information. Audio codec 960 may likewise generate audible sound for a user, such as through a speaker, e.g., in a handset of device 950. Such sound may include sound from voice telephone calls, may include recorded sound (e.g., voice messages, music files, etc.) and may also include sound generated by applications operating on device 950.

The computing device 950 may be implemented in a number of different forms, as shown in the figure. For example, it may be implemented as a cellular telephone 980. It may also be implemented as part of a smartphone 982, personal digital assistant, a tablet computer 983 or other similar mobile computing device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

It will be understood that the inventive system has been described with reference to particular embodiments, however additions, deletions and changes could be made to these embodiments without departing from the scope of the inventive system. Although the systems that have been described include various components, it is well understood that these components and the described configuration can be modified and rearranged in various other configurations. For example, while the patent application describes beer and breweries, this inventive process can be applied to other beverages, food, bars and restaurants.

What is claimed:

1. A method for remotely transmitting beverage gifts comprising:
   providing a server in communication with a network, a database and a plurality of mobile computing devices, wherein the plurality of mobile computing devices are in communication with the server through the network;
   storing, on the database, points and the beverage gifts for each of a plurality of users of the plurality of mobile computing devices;
   detecting, by a first mobile computing device, that the first mobile computing device is at a brewery;
   displaying, by the first mobile computing device, a survey associated with the brewery where the first mobile computing device is located;
   receiving, by the server from the first mobile computing device, answers to the survey by a first user;
   transmitting, by the server, a quantity of points for the first user of the first mobile computing device to the database after the answers to the survey have been received;
   receiving, by the server, a purchase of a first beverage gift by the first user using some of the points for the first user from the database;
   receiving, by the server from the first mobile computing device, a request to transmit the first beverage gift from the first user to a second user;
   generating, by the server, a first token by the server for the first beverage gift;
   recording, by the server, the first token for the first beverage gift for the second user in the database;
   transmitting, by the server, the first token for the first beverage gift to a second mobile computing device;
   receiving, by the server, redeeming information for the first beverage gift from by the second mobile computing device;
   converting, by the server, the first beverage gift from an available gift to a redeemed beverage gift for the second user in the database.

2. The beverage gifting method of claim 1 further comprising:
   providing a button on a user interface for controlling the points and the monetary funds used for purchasing the first beverage gift; and
   purchasing the first beverage gift using a combination of the points and the monetary funds.

3. The beverage gifting method of claim 2 wherein the user interface is a slider button that is moved to adjust the points and the monetary funds used for purchasing the first beverage gift.

4. The beverage gifting method of claim 1 further comprising:
   transmitting, by the first mobile computing device, a message with the first token for the first beverage gift to the second mobile computing device; and
   displaying, by the second mobile computing device, the message.

5. The beverage gifting method of claim 1 further comprising:
   displaying, by the second mobile computing device, an age verifying message indicating that an age of the second user is above 21 years old;
   wherein the beverage is an alcoholic beverage.

6. The beverage gifting method of claim 1 further comprising:
   receiving, by the server, biometric data input into a sensor integrated into the second mobile computing device; and
   verifying, by the server, that an age of the second user is above 21 years old;
   wherein the beverage is an alcoholic beverage.

7. The beverage gifting method of claim 1 further comprising:
   receiving, by the server, biometric data input into a sensor integrated into the mobile computing device;
   determining, by the server, that an age of the second user is below 21 years old; and
   displaying, by the second mobile computing device, a message indicating that an age of the second user is under 21 years old to prevent the redeeming of the first beverage gift;
   wherein the beverage is an alcoholic beverage.

8. The beverage gifting method of claim 1 further comprising:
   transmitting, by the server, a payment for the redeemed beverage gift to a beverage supplier of the redeemed beverage gift.

9. The beverage gifting method of claim 1 further comprising:
   displaying, on the second mobile computing device, the first beverage gift as an available beverage.

10. The beverage gifting method of claim 1 further comprising:
    displaying, on the first mobile computing device, the first beverage gift as a sent beverage gift icon.

11. A method for remotely transmitting beverage giftings comprising:

providing a server in communication with a network, a database and a plurality of mobile computing devices, wherein the plurality of mobile computing devices are in communication with the server through the network and the database storing points for each of a plurality of users;

storing, on the database, points and the beverage gifts for each of the plurality of users;

detecting, by a first mobile computing device, that the first mobile computing device is at a brewery;

displaying, on a first mobile computing device, a survey associated with the brewery where the first mobile computing device is located having a plurality of questions;

receiving, by the server from a first mobile computing device, answers to the survey;

adding, by the server, a quantity of points for the first user of the first mobile computing device to the database after the answers to the survey have been received;

receiving, by the server, a purchase of a first beverage gift by the first user using some of the points for the first user;

transmitting, by the server, the first beverage gift to a second mobile computing device;

receiving, by the server, redeeming information for the first beverage gift from the second mobile computing device; and converting, by the server, the first beverage gift from an available beverage gift to a redeemed beverage gift for the second user in the database.

12. The beverage gifting method of claim 11 further comprising:

transmitting, by the server, a payment for the redeemed beverage gift to a beverage supplier of the redeemed beverage gift.

13. The beverage gifting method of claim 11 further comprising:

providing a button on a user interface for controlling the points and the monetary funds used for purchasing the first beverage gift; and purchasing the first beverage gift using some of the points.

14. The beverage gifting method of claim 11 further comprising:

transmitting, by the first mobile computing device, a message with the first beverage gift to the second mobile computing device; and displaying, by the second mobile computing device, the message when the first beverage gift is transmitted to a second mobile computing device.

15. The beverage gifting method of claim 11 further comprising:

displaying, on the first mobile computing device, the first beverage gift as a sent beverage gift icon.

16. A method for remotely transmitting beverage gifts comprising:

providing a server in communication with a network, a database and a plurality of mobile computing devices, wherein the plurality of mobile computing devices are in communication with the server through the network and the database storing points for each of a plurality of users;

storing, on the database, points and the beverage gifts for each of the plurality of users;

receiving, by the server, a purchase of a first beverage gift by the first user using some of the points for the first user;

transmitting, by the server, the first beverage gift to a second mobile computing device;

detecting, by the second mobile computing device, a location of the second mobile computing device;

displaying, by the second mobile computing device, a brewery selection tool;

randomly selecting, by the second mobile computing device, a selected brewery from the listing of beverage gifting participant breweries, in proximity of the location of the second mobile computing device using the brewery selection tool;

displaying the selected brewery on the user interface on the second mobile computing device;

receiving, by the server, redeeming information for the first beverage gift from the second mobile computing device; and converting, by the server, the first beverage gift from an available beverage gift to a redeemed beverage gift for the second user in the database.

17. The beverage gifting method of claim 16 further comprising:

transmitting, by the server, a payment for the redeemed beverage gift to a beverage supplier of the redeemed beverage gift.

18. The beverage gifting method of claim 16 further comprising:

displaying, on the first mobile computing device, the first beverage gift as a sent beverage gift icon.

19. The beverage gifting method of claim 16 further comprising:

transmitting, by the first mobile computing device, a message with the first beverage gift to the second mobile computing device; and displaying, by the second mobile computing device, the message when the first beverage gift is transmitted to a second mobile computing device.

* * * * *